US005864354A

United States Patent [19]

Hibino et al.

[11] Patent Number: 5,864,354

[45] Date of Patent: Jan. 26, 1999

[54] UV-FIXABLE THERMAL RECORDING APPARATUS AND RECORDING METHOD

[75] Inventors: Kiyoshi Hibino; Satoshi Kuwabara; Koji Mabuchi; Etuzi Shimizu, all of Gifu, Japan

[73] Assignee: Sanyo Electric Co., Ltd, Osaka-fu, Japan

[21] Appl. No.: 541,486

[22] Filed: Oct. 10, 1995

[30] Foreign Application Priority Data

| | | | |
|---|---|---|---|
| Oct. 12, 1994 | [JP] | Japan | 6-245871 |
| Jul. 19, 1995 | [JP] | Japan | 7-182751 |

[51] Int. Cl.[6] .......... B41J 2/315; G01D 15/10

[52] U.S. Cl. .......... 347/212

[58] Field of Search .......... 347/175, 102, 347/211, 232, 156, 212, 155; 399/320, 336; 355/113, 114; 400/120.18

[56] References Cited

U.S. PATENT DOCUMENTS 5,486,856 1/1996 Katsuma et al. .......... 347/175

*Primary Examiner*—N. Le
*Assistant Examiner*—L. Anderson
*Attorney, Agent, or Firm*—Darby & Darby

[57] ABSTRACT

A UV-fixable thermal recording apparatus uses UV-fixable color thermal recording paper, uniformity of light intensity distribution, high efficiency and miniaturization of a fixing lamp to prevent degradation of the print quality this apparatus has at least one fixing lamp, and a row of heating resistors in the form of a plurality of heating resistors arranged parallel to the direction of paper delivery. The width in the direction of paper delivery of an area of the paper exposed by the fixing lamp is made larger than the length of the row of heating. resistors. The fixing lamp and the row of heating resistors are so arranged that the position of an (end on the upstream side in the forward direction of paper delivery) of the exposed area of the fixing lamp is on the downstream side of the position of an end (on the upstream side in this direction) of the row of heating resistors.

17 Claims, 20 Drawing Sheets

UV-FIXABLE THERMAL RECORDING APPARATUS AND RECORDING METHOD

BACKGROUND OF THE INVENTION

1. Field of the Invention

The present invention relates to a UV-fixable thermal recording apparatus for forming an image using UV-fixable thermal recording paper on which a full color image can be formed by heating. This apparatus may be used for a color printer, a video printer, a color facsimile or a like device which serves as an output device of a personal computer or a word processor.

2. Description of the Prior Art

UV-fixable color thermal recording paper is one on which respective colors can be selectively fixed by light rays, such as ultraviolet rays or electromagnetic waves. The developed color density of the paper varies depending on the amount of heat applied, the minimum amount of heat differs depending on which of the colors is to be developed and the particular wavelength. It has the advantages that full color recording can be made thereon without using ink, as compared with conventional ink-jet recording or thermal transfer recording.

UV-fixable color thermal recording paper is disclosed in Japanese Patent Laid-Open No. 40192/1986, for example. The UV-fixable thermal recording paper is constructed by laminating a yellow color forming layer, a magenta color forming layer and a cyan color forming layer in order from the top on a base film. The minimum amounts of heat respectively required to develop yellow, magenta and cyan colors are increased in this order, and the yellow color forming layer and the magenta color forming layer are irradiated with ultraviolet rays having different particular wavelength ranges so that they are fixed. On the other hand, the cyan color forming layer is not fixed.

In the case of recording on the UV-fixable thermal recording paper, at the time of developing a yellow color, an amount of heat which is less than the minimum amounts of heat respectively required to develop magenta and cyan colors are applied, whereby magenta and cyan colors are not developed, and only a yellow color can be developed. After developing a yellow color, only the yellow color forming layer is fixed by a fixing lamp for the yellow color.

At the time of developing a magenta color, an amount of heat which is less than the minimum amount of heat required to develop a cyan color is applied, whereby a cyan color is not developed. Since the yellow color forming layer has already been fixed, a yellow color is not developed again. After developing a magenta color, only the magenta color forming layer is fixed by a fixing lamp for the magenta color.

At the time of developing a cyan color, the yellow and magenta color forming layers have already been fixed, whereby yellow and magenta colors are not developed again, and only a cyan color can be developed.

A multihead type recording apparatus using UV-fixable color thermal recording paper is disclosed in Japanese Patent Laid-Open No. 24233/1993, for example. FIG. 25 of the present application is a cross-sectional view showing this conventional recording apparatus.

The recording apparatus comprises heating resistors 51*a*, 51*b* and 51*c* in three rows, and notches 56*a* and 56*b* respectively provided between the adjacent heating resistors 51*a*, 51*b* and 51*c*. The heating temperatures of the heating resistors 51*a*, 51*b* and 51*c* in three rows are set to decrease in the order in which the heating resistors come into contact with thermal recording paper 60, and the heating resistors

51*a*, 51*b* and 51*c* are respectively used for yellow, magenta and cyan colors.

Individual electrodes 52*a* and 52*c* and common electrodes 53*a*, 53*b* and 53*c* are respectively connected to the heating resistors 51*a*, 51*b* and 51*c*, and the individual electrodes 52*a* and 52*c* are connected to a head driving circuit 57. The illustration of the individual electrode and the like connected to the heating resistor 51*b* is omitted.

A fixing lamp for a yellow color 54*a* is arranged between the heating resistor for a yellow color 51*a* and the heating resistor for magenta color 51*b*, and a fixing lamp for magenta color 54*b* is arranged between the heating resistor for a magenta color 51*b* and the heating resistor for cyan color 51*c*.

Exposure of the UV light from lamps 54 to the thermal recording paper 60 is made through the notches 56*a* and 56*b* which are provided in a head 50. Lenses 58*a*, 58*b*, 59*a* and 59*b* are provided in order to efficiently collect light from the fixing lamps 54*a* and 54*b* and direct it onto the thermal recording paper 60. A shading member 55 is further provided in order to prevent light from being irradiated onto portions other than the corresponding portions.

Referring still to FIG. 25, description is now made of the recording operation of the recording apparatus. The thermal recording paper 60 is conveyed with it being interposed between the head 50 and a platen roller (not shown). A yellow color forming layer is developed by the heating resistor for a yellow color 51*a*, and is fixed by the fixing lamp for the yellow color 54*a*. A magenta color forming layer is then developed by the heating resistor for the magenta color 51*b*, and is fixed by the fixing lamp for the magenta color 54*b*. A cyan color forming layer is finally developed by the heating resistor for the cyan color 51*c*.

A serial thermal head type recording apparatus using UV-fixable color thermal recording paper is disclosed in Japanese Patent Laid-Open No. 124352/1993, for example. FIG. 26 is a perspective view showing the construction of this recording apparatus.

As shown in FIG. 26*a* fixing lamp for a yellow color 63*a* and a fixing lamp for a magenta color 63*b* are arranged with a thermal head 62 interposed therebetween in a serial head section 61. The serial head section 61 is so arranged as to be movable back and forth in the width direction of thermal recording paper 60 by the rotation of a timing belt 64. The longitudinal thermal recording paper 60 is sent to the print position in which the serial head section 61 exists by a conveying roller 65*a* positioned on the upstream side, a conveying roller 65*b* positioned on the downstream side, a pinch roller 66*a* positioned on the upstream side and a pinch roller 66*b* positioned on the downstream side. The thermal recording paper 60 is cut by a cutter 67 when it is moved by a predetermined length.

Referring again to FIG. 26, the recording operation of the recording apparatus will be described.

Printing is done while the serial head section 61 is moved in a direction perpendicular to the direction of delivery of the thermal recording paper 60 (direction of the arrow) in synchronism with the conveyance of the thermal recording paper 60. The serial head section 61 is moved in such a direction of progress that the fixing lamp for a yellow color 63*a* is in the rearward position of travel at the time of printing of a yellow color, while the fixing lamp for a magenta color 63*b* is in the rearward position at the time of printing of a magenta color. Yellow, magenta and cyan colors are successively printed for each line.

In recording using the UV-fixable color thermal recording paper, when an area where printing has not yet been done is exposed by the fixing lamps, no colors are developed even if it is then heated for printing. Therefore, a device in which the fixing lamps are enclosed by a skirt or shield made of rubber or the like to intercept light has been proposed.

The problems with the above-described UV-fixable thermal recording apparatus, will now be described for the case of a serial thermal head in which a row of heating resistors and a fixing lamp are adjacent to each other.

FIGS. 27A to 27I illustrate the positional relationship between the length of a row of heating resistors 70 (the width of recording) in the serial thermal head and the width of exposure 71 in the direction of paper delivery in a case where the fixing lamp is enclosed by a shield member.

FIGS. 27A, 27B and 27C illustrate a case where the position DD of an end on the upstream side in the forward direction of paper delivery of the row of heating resistors 70 is on the upstream side of the position BB of an end on the upstream side of the exposure area 71 in this direction. In this case, in FIGS. 27A, 27B and 27C, a portion between line segments BB and DD has not been fixed yet and is developed at the time of printing colors in the succeeding line.

FIGS. 27D, 27E and 27F illustrate a case where the position BB of an end on the upstream side in the forward direction of paper delivery of the row of heating resistors 70 is on the downstream side of the position DD of an end on the upstream side of the exposure area 71 in this direction. In this case, even a part of an area which has not been developed yet by heating in the succeeding line is exposed to be fixed. In FIGS. 27D, 27E and 27F, a portion between line segments BB and DD has been exposed before being developed, and is not developed at the time of printing colors in the succeeding line.

FIGS. 27G, 27H and 27I illustrate a case where the position BB of an end on the upstream side in the forward direction of paper delivery of the row of heating resistors 70 is the same as the position DD of an end on the upstream side of the exposure 71 area in this direction. In this case, the above-described problems do not occur. However, it is difficult to realize the positional relationship between the row of heating resistors and an exposed area with high precision. In addition, light also leaks into a peripheral end of the exposed area, whereby it is difficult to strictly realize the positional relationship. When the positional relationship is disturbed, there occurs such degradation of the print quality that stripes of the pitch between the widths of recording are formed from the above-described reasons.

On the other hand, as the conventional fixing lamp, a fluorescent lamp in the shape of a tube for emitting ultraviolet rays is used. The fluorescent lamp generally has counter electrodes at both ends in the longitudinal direction of the tube, whereby the quantity of light is small so that uniform light quantity distribution is not obtained in the vicinity of the electrodes. Therefore, fixing becomes non-uniform. For example, additional color development occurs by heat for developing the succeeding color in the vicinity of the electrodes where fixing is insufficient, thereby degrading the image quality. If in order to solve this, the intensity of light emission is increased as a whole, a middle portion of the paper will be exposed more than necessary. Although the peak wavelengths differ in spectral sensitivity differ in a case where a yellow color forming layer is fixed and where a magenta color forming layer is fixed, each spectral sensitivity has broad distribution. As a result, if the intensity of exposure of a yellow color forming layer first made is too high, a magenta color forming layer to be subsequently developed is prevented from being developed, thereby degrading color reproducibility.

Furthermore, in order to solve the decrease in the color reproducibility, if the length of the fluorescent lamp is larger than the width of recording so as not to use the vicinity of the electrodes where the quantity of light is small, the recording apparatus is increased in size. Further, light is unnecessarily emitted, thereby increasing the power consumption and the size of the power supply.

Additionally, it is desirable for thermal recording by the thermal head and fixing by the fixing lamp to be performed at the same speed in order to increase the recording speed. Further, the exposure conditions must be changed depending on the recording speeds of various specifications. Factors for determining a necessary quantity of light are the light intensity, the exposure area, and the moving speed. Since in the conventional fixing lamp, light quantity distribution is not constant, light intensity distribution is not constant. Therefore, a combination of an output of the fluorescent lamp and the exposure area for satisfying the requirements determined moving speed is at a particular by trial and error.

SUMMARY OF THE INVENTION

An object of the present invention is to prevent, in a recording apparatus using UV-fixable color thermal recording paper, degradation of the print quality in a case where a serial thermal head has a row of heating resistors and a fixing lamp are adjacent to each other.

Another object of the present invention is to prevent, in the above-described thermal recording apparatus using UVfixable color thermal recording paper, degradation of the print quality by achieving uniformity of light intensity distribution, high efficiency and miniaturization of a fixing lamp.

In order to attain the above-described objects, a suitable example of the present invention is characterized, as a UV-fixable thermal recording apparatus for supplying a plurality of types of heat energy by heating resistors to thermal recording paper on which respective colors can be selectively fixed by light rays or electromagnetic waves in order to form a color image thereon. The developed color density varies depending on the amount of heat, where the minimum amount of heat differs depending on which of the colors is to be developed, and the particular wavelength. The apparatus comprises at least one fixing lamp, and a row of heating resistors. This plurality of heating resistors is arranged parallel to the direction of paper delivery. The width in the direction of paper delivery of an exposed area of the fixing lamp is made larger than the length of the row of heating resistors, and the fixing lamp and the row of heating resistors are so arranged that the position of an end (on the upstream side in the forward direction of paper delivery) of the exposed area of the fixing lamp is on the downstream side of the position of an end of the row of heating resistors on the upstream side in this direction.

According to the above-described suitable example, color development and fixing can be performed almost simultaneously, thereby making it possible to reduce total printing time. Even if the row of heating resistors and the fixing lamp are adjacent to each other, the possibility that printing is insufficiently done due to color redevelopment and unfixing is eliminated, thereby making it possible to miniaturize the entire recording apparatus. In addition, printing is not affected even if the positional precision between the exposed area and the row of heating resistors is low, thereby improving the assembly productivity of a recording head. More preferably, in the present invention, the row of heating resistors and the fixing lamp may be carried on a common carriage which moves while abutting against the thermal recording paper, and a flexible heat radiator may be further related to at least one of the row of heating resistors and the fixing lamp.

According to the suitable example, the thermal effect between the row of heating resistors and the fixing lamp can be prevented.

Furthermore, the recording apparatus in the suitable example of the present invention may be so constructed that the fixing lamp has counter electrodes approximately parallel to the row of heating resistors, which electrodes induce discharges between the counter electrodes to irradiate light rays or electromagnetic waves having a particular wavelength.

According to the suitable example, the fixing lamp has counter electrodes approximately parallel to the row of heating resistors, whereby the density of electrons discharged from the counter electrodes reaches uniformity in the longitudinal direction of the electrodes. As a result, the intensity distribution of radiated light rays or electromagnetic waves having a particular wavelength is uniform in the same direction, thereby bringing about uniform fixing with respect to the thermal recording paper on which the row of heating resistors is directed.

Furthermore, in the suitable example of the present invention, the fixing lamp further comprises a section emitting light in a surface shape which faces the thermal recording paper.

According to the suitable example, the fixing lamp comprises a section emitting light in a surface shape which faces the thermal recording paper, thereby to obtain more uniform intensity distribution.

Furthermore, in the suitable example of the present invention, the fixing lamp has restricting means abutting against the thermal recording paper for restricting light rays or electromagnetic waves having a particular wavelength radiated from the section emitting light in a surface shape to a portion of the thermal recording paper which faces the section emitting light in a surface shape.

According to the suitable example, the fixing lamp has restricting means abutting against the thermal recording paper for restricting light rays or electromagnetic waves having a particular wavelength radiated from the section emitting light in a surface shape to a portion of the thermal recording paper which faces the section emitting light in a surface shape, thereby to make it possible to accurately irradiate the light rays or the electromagnetic waves having a particular wavelength onto a portion to be fixed.

Furthermore, the present invention is characterized as a UV-fixable thermal recording method in which a plurality of types of heat energy are supplied by heating resistors to thermal recording paper on which respective colors can be selectively fixed by light rays or electromagnetic waves to form a color image therein. The developed color density varies depending on the amount of heat for heating, wherein the minimum amount of heat differs depending on which of the colors can be developed, and a particular wavelength. There is also provided a recording head. According to the method at least one fixing lamp and a row of heating resistors which include a plurality of heating resistors arranged parallel to the direction of paper delivery are used. The width in the direction of paper delivery of an exposed area of the fixing lamp is made larger than the length of the row of heating resistors, and the fixing lamp and the row of heating resistors are so arranged that the position of an end (on the upstream side in the forward direction of paper delivery) of the exposed area of the fixing lamp is on the downstream side of the position of an end (on the upstream side in this direction of the row of heating resistors. This method comprises the steps of: (a) scanning the recording head in a direction intersecting the direction of paper delivery to do printing of the arbitrary k-th (k is an integer) color in the arbitrary i-th (i is an integer) line, (b)conveying the thermal recording paper in the backward direction by an amount which is predetermined with respect to the k-th color over all the lines at a distance longer than the distance between the position of an end on the downstream side (in the forward direction of paper delivery) of the width of exposure of the fixing lamp for the k-th color and the position of an end on the downstream side of the row of heating resistors and shorter than the pitch corresponding to one line, (c) performing the operation over all colors in the i-th line, and (d) conveying the thermal recording paper in the forward direction by the sum of the pitch corresponding to one line and the total amount of feeding of the thermal recording paper conveyed in the backward direction during printing of the colors in the i-th line before printing of colors in the (i+1)-th line.

According to the above described invention, when the first color corresponding to the i-th line, for example, a yellow color is developed and fixed, a yellow color unfixed portion occurs by the positional relationship between the exposed area and the row of heating resistors, thereby preventing a yellow color undeveloped portion in the succeeding line from being previously fixed.

The second color corresponding to one line, for example, a magenta color is then developed and fixed. An area where a magenta color is developed is in an area where a yellow color has already been fixed by a fixing lamp for a yellow color in the i-th line and the (i−1)-th line, whereby a yellow color is not developed again.

Furthermore, an area where a magenta color is developed does not include the yellow color unfixed portion in the i-th line, whereby a yellow color is not developed again in this yellow color unfixed portion.

When a magenta color corresponding to one line is developed and fixed, a magenta color unfixed portion occurs from the positional relationship between the exposed area and the row of heating resistors, thereby preventing a magenta color undeveloped portion in the succeeding line from being previously fixed.

An area where the third color, for example, a cyan color is developed is in an area where magenta and yellow colors have already been fixed by a fixing lamp for a magenta color and a fixing lamp for a yellow color in the i-th line and the (i−1)-th line, whereby magenta and yellow colors are not developed again.

Furthermore, an area where a cyan color is developed does not include a magenta and yellow colors unfixed portion in the i-th line, whereby magenta and yellow colors are not developed again in this magenta and yellow colors unfixed portion.

At the time of fixing a yellow color in the (i+1)-th line, the yellow color unfixed portion in the i-th line is fixed. In addition, at the time of fixing a magenta color in the (i+1)-th line, the magenta color unfixed portion in the i-th line is fixed. The width of the exposed area in the direction of paper delivery is set to be larger than the width in the longitudinal direction of the row of heating resistors, whereby the yellow and magenta colors unfixed portion in the i-th line is completely covered with the exposed area in the (i+1)-th line, whereby no fixing remains.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the drawings.

Figure 1:
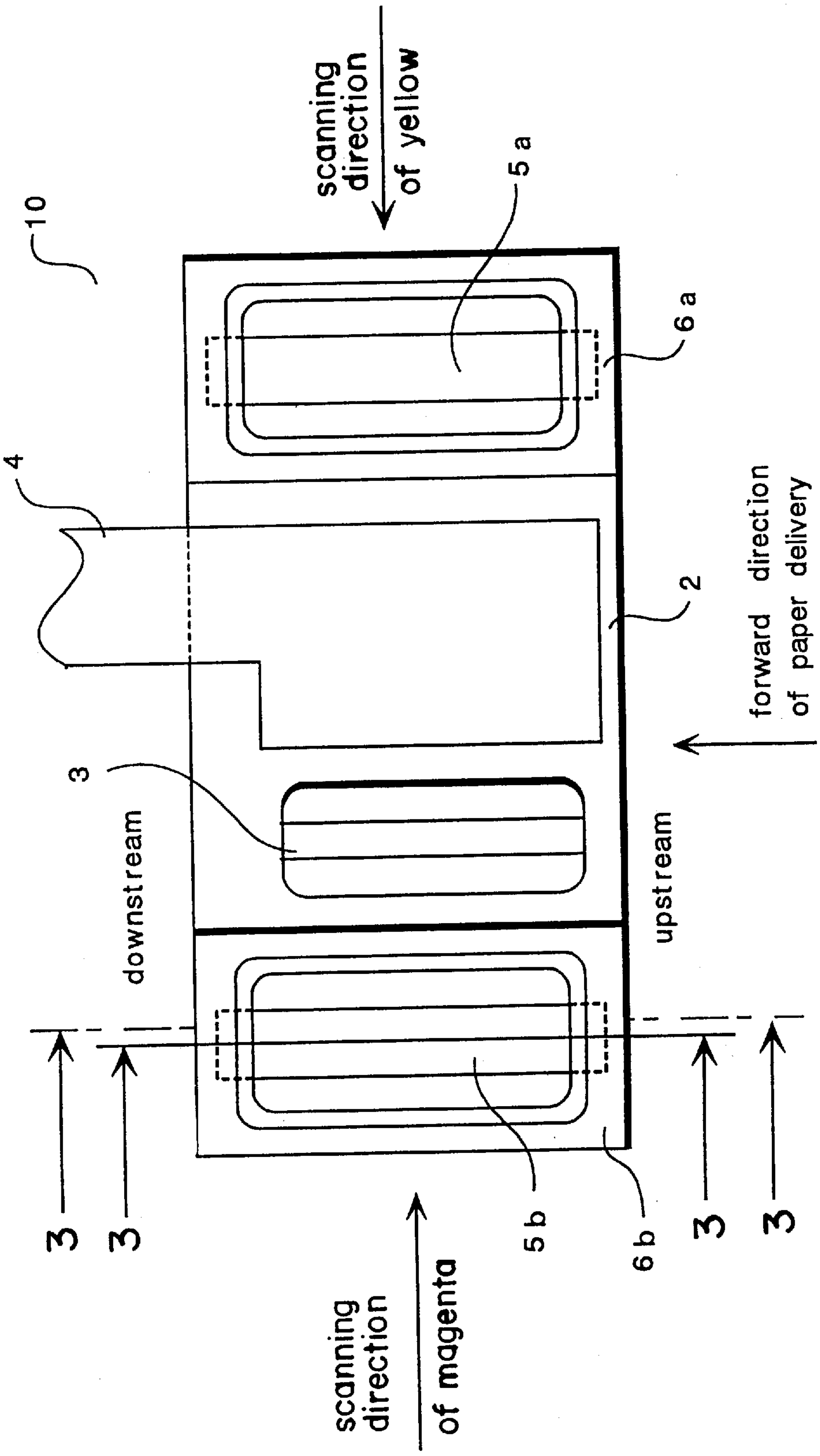
FIG. 1 is a front view showing a recording section which is a principal part of a UV-fixable thermal recording apparatus according to a first embodiment of the present invention as viewed from the thermal recording paper.
Figure 2:
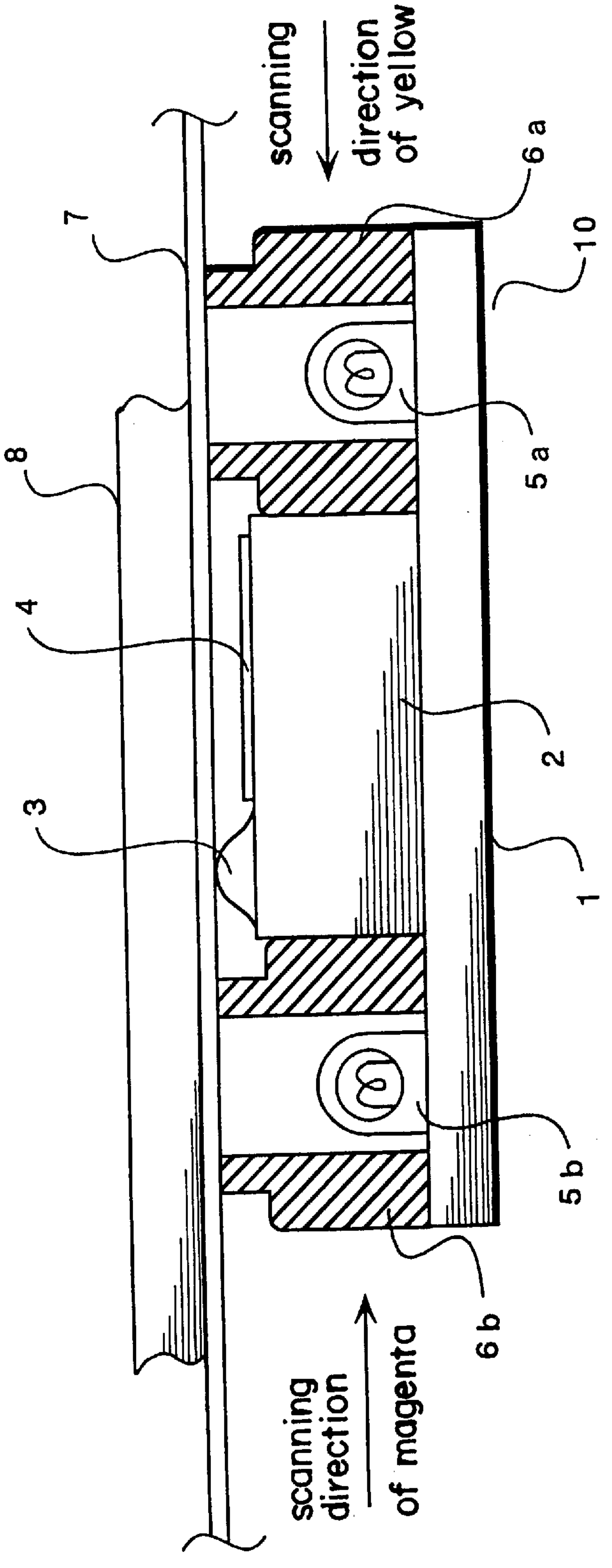
FIG. 2 is a sectional side elevation showing the principal part of the UV-fixable thermal recording apparatus according to the first embodiment of the present invention.

FIG. 1 is a front view showing a recording section which is a principal part of a UV-fixable thermal recording apparatus according to a first embodiment of the present invention as viewed from thermal recording paper. This view illustrates the construction of a serial thermal head, in which a row of heating resistors is in the form of a plurality of heating resistors arranged in one row, and a fixing lamp are arranged adjacent to each other. FIG. 2 is a sectional side elevation thereof, and FIG. 3 is a cross-sectional view taken along a line A—A' shown in FIG. 1.

Figure 3:
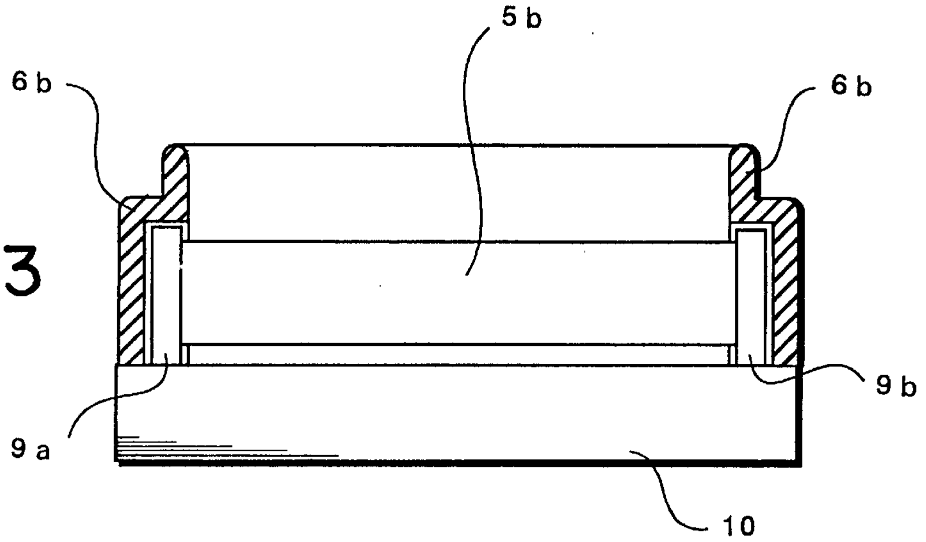
FIG. 3 is a cross-sectional view taken along a line A—A' shown in FIG. 1.

As shown in FIGS. 1 to 3, a thermal head 10 according to the present embodiment comprises a head supporting plate 1 composed of aluminum or the like, a thermal head substrate 2 composed of alumina or the like which is provided on the head supporting substrate 1, and a row of heating resistors 3 for thermal recording in the form of a plurality of, heating resistors arranged in one row on the thermal head substrate 2. Power is supplied to the row of heating resistors 3 from a flexible cable 4.

The row of heating resistors 3, a pair of electrodes (not shown) and the like are formed by a thin film technique or a thick film technique. The number of heating resistors is determined by the width of the print area that corresponds to one line and by the resolution. Sixty-four (64) heating resistors are used in a case where the resolution is 150 dpi and the line width is approximately 10 mm. The row of heating resistors 3 is controlled in response to a recording signal by a head driving IC (not shown) provided in the leading end of the flexible cable 4.

A fixing lamp 5*a* which is constituted by a ultraviolet lamp for fixing a yellow color is provided in a position, which follows the scanning direction for a yellow color of the row of heating resistors 3 on the head supporting plate 1. The fixing lamp 5*a* has a peak wavelength of 420 nm. In addition, a fixing lamp 5*b* which is constituted by a ultraviolet lamp for fixing a magenta color is provided in a position, which follows the scanning direction for a magenta color of the row of heating resistors 3 on the head supporting plate 1. The fixing lamp 5*b* has a peak wavelength of 365 nm. Power is supplied to the fixing lamps 5*a* and 5*b* through lamp electrode sections 9*a* and 9*b*.

Both the fixing lamps 5*a* and 5*b* are respectively enclosed by shading members 6*a* and 6*b*, whereby their exposed areas are restricted by the shading members 6*a* and 6*b*. In order to intercept light, the shading members 6*a* and 6*b* must be brought into contact with UV-fixable thermal recording paper 7. Thus soft rubber whose friction is reduced by surface treatment is suitable for construction of the shading members 6*a*, 6*b*.

The width of the exposed areas restricted by the shading members 6*a* and 6*b* in the direction of paper delivery, that is, the longitudinal direction of the row of heating resistors 3 is set to be larger than the width in the longitudinal direction of the row of heating resistors 3. Further, the shading members 6*a* and 6*b* are so arranged that the position of an end of the exposed area on the upstream side in the forward direction of paper delivery is on the downstream side of the position of an end on the upstream side of the row of heating resistors 3. As shown in FIG. 2, the thermal head 10 is pressed against platen rubber 8 with the thermal recording paper 7 interposed therebetween.

The construction of the UV-fixable thermal recording apparatus according to the present invention using the described thermal head will be above-described with reference to FIGS. 4 and 5.

Figure 4A:
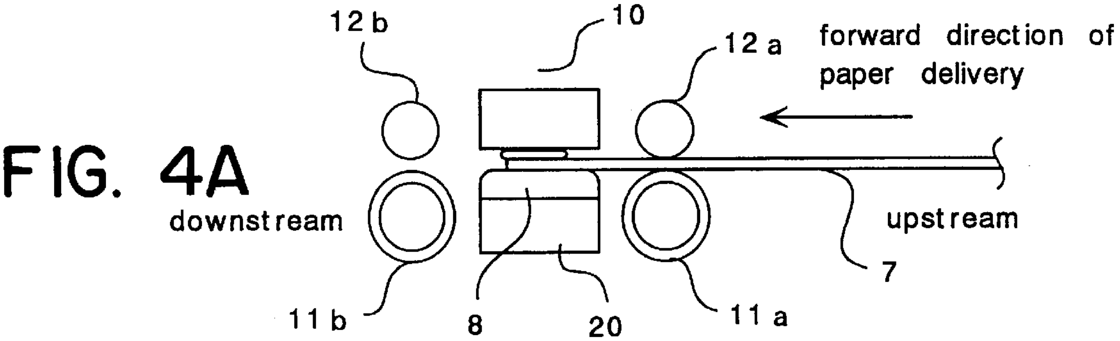
FIGS. 4A to 4C are side views showing the principal part of the UV-fixable thermal recording apparatus according to the first embodiment of the present invention.
Figure 4B:
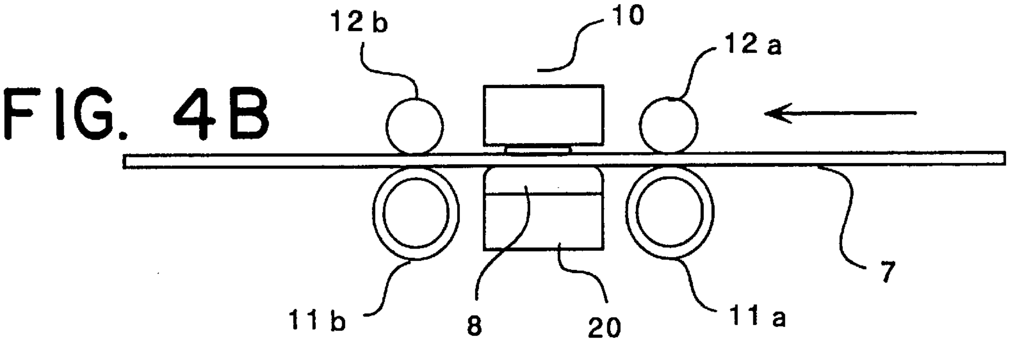
Figure 4C:
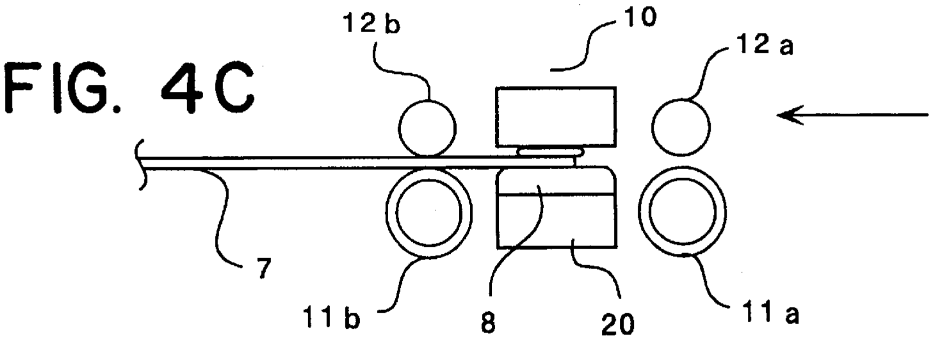
Figure 5:
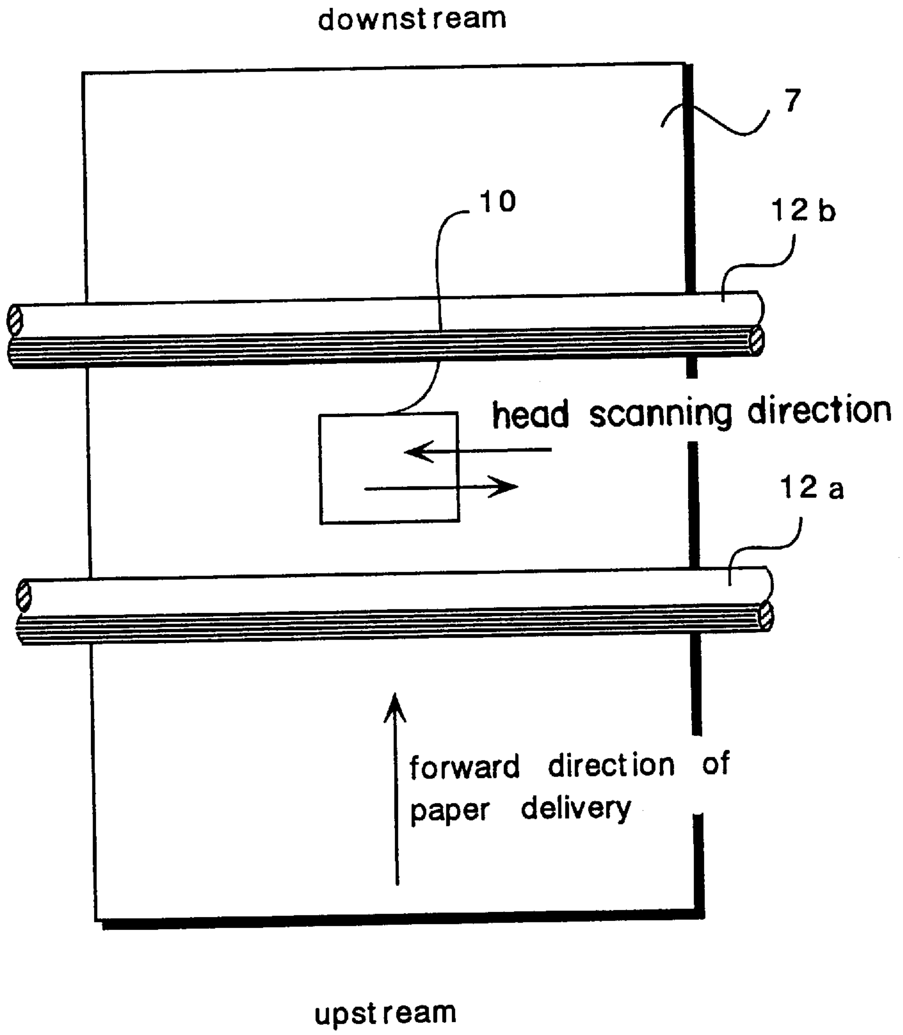
FIG. 5 is a top view showing the principal part of the UV-fixable thermal recording apparatus according to the first embodiment of the present invention.

FIG. 4 is a side view showing a principal part of the UV-fixable thermal recording apparatus according to the present invention, and FIG. 5 is a top view showing the principal part of the recording apparatus.

In the recording apparatus, a conveying roller 11*a* positioned on the upstream side and a pinch roller 12*a* positioned on the upstream side and a conveying roller 11*b* positioned on the downstream side and a pinch roller 12*b* positioned on the downstream side are respectively provided on the upstream side and the downstream side in the forward direction of paper delivery with the thermal head 10 interposed therebetween. The thermal head 10 is pressed against flat plate platen rubber 8 mounted on a supporting plate 20, to develop the UV-fixable color thermal recording paper 7 sent to a portion between the thermal head 10 and the platen rubber 8 by heating of the row of heating resistors 3 and fixing the thermal recording paper 7 by the fixing lamps 5*a* and 5*b*.

The thermal recording paper 7 can be conveyed in the forward and backward directions by the conveying rollers 11*a* and 11*b* and the pinch rollers 12*a* and 12*b* positioned on the upstream and downstream sides.

Recording is done by moving the thermal head 10 back and forth while conveying the thermal recording paper 7 at a pitch corresponding to one line.

Figure 6:
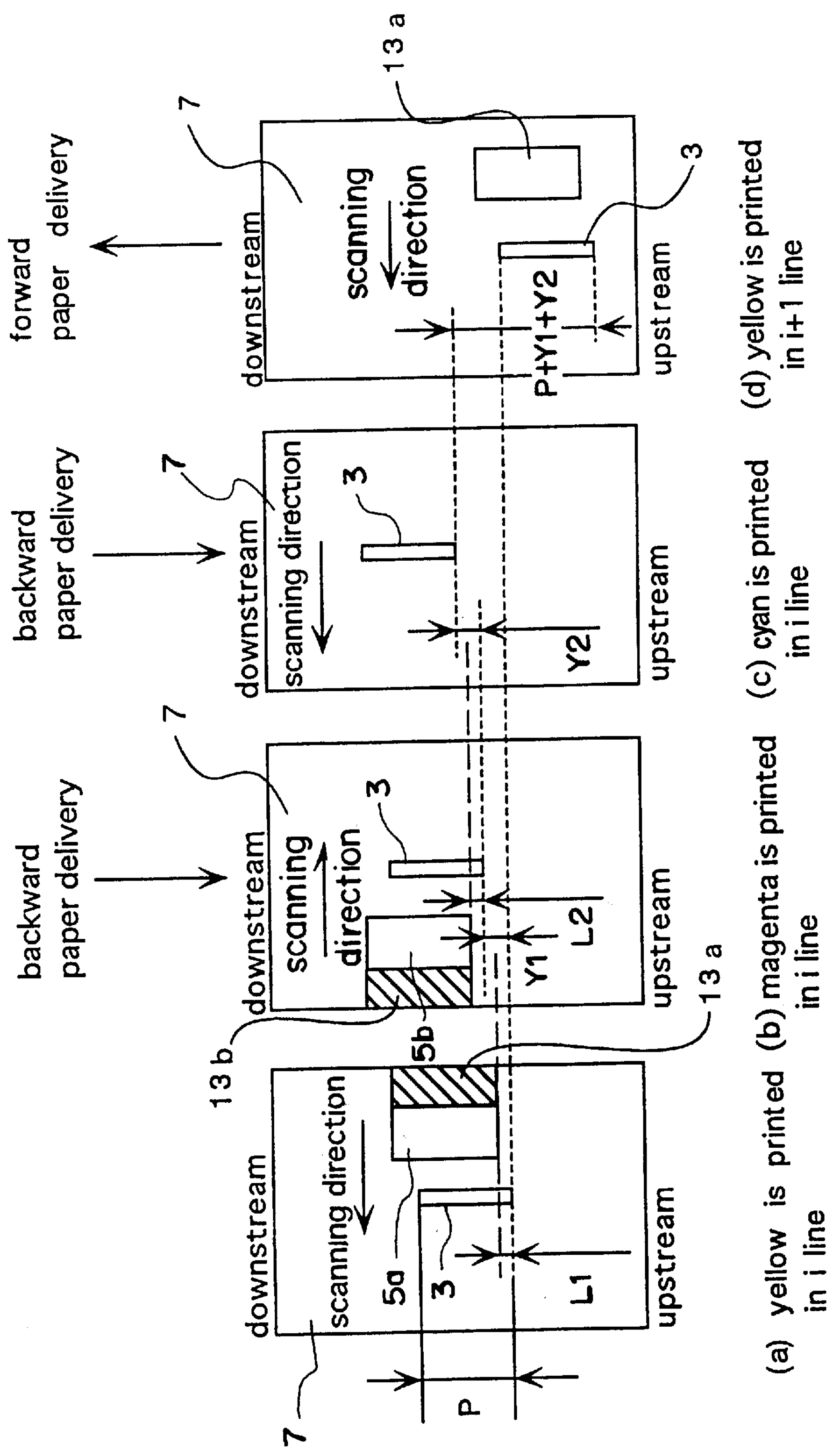
FIG. 6 is a typical view for explaining the recording states of respective colors in the UV-fixable thermal recording apparatus according to the first embodiment of the present invention.

Description is now made starting with recording in the i-th line in the above-described recording apparatus on the basis of FIG. 6. FIG. 6 illustrates the relationship between the width of this recording area and the width of the exposed area in the direction of paper delivery in a case where yellow, magenta and cyan colors are printed, assuming that the thermal recording paper 7 is fixed.

First, a yellow color is developed and fixed while the thermal head 10 is scanned in a direction from a fixing lamp for a yellow color 5*a* toward the row of heating resistors 3. Specifically, a yellow color is fixed by ultraviolet rays after being developed by heat. When a yellow color corresponding to one line is developed and fixed, only a portion indicated by L1 in FIG. 6 (*a*) has not been fixed from the positional relationship between an exposed area for a yellow color 13*a* and the row of heating resistors 3. In other words, a color undeveloped portion in the succeeding line is prevented from being previously fixed.

The thermal recording paper 7 is then conveyed in the backward direction by Y1 shown in FIG. 6 (*b*). Y1 is a distance longer than L1 shown in FIG. 6 (*a*) and naturally shorter than the pitch between lines P corresponding to the length of the row of heating resistors 3.

Thereafter, a magenta color is developed and fixed while the thermal head 10 is scanned in a direction from a fixing lamp 5*b* for a magenta color toward the row of heating resistors 3. Specifically, an area where a magenta color is developed is in an area where a yellow color has already been fixed by the fixing lamp for a yellow color 5*a* using ultraviolet rays after being developed by heat, whereby a yellow color is not developed again.

Furthermore, the area where a magenta color is developed does not include a yellow color unfixed portion in the i-th line (a portion having the width L1), whereby a yellow color is not developed again in this yellow color unfixed portion.

When a magenta color corresponding to one line is developed and fixed, only a portion indicated by L2 in FIG. 6 (*b*) has not been fixed yet from the positional relationship between an exposed area for a magenta color 13*b* and the row of heating resistors 3. In other words, a color undeveloped portion in the succeeding line is prevented from being previously fixed.

The thermal recording paper 7 is then conveyed in the backward direction by Y2 shown in FIG. 6 (*c*). Y2 is a distance longer than L2 shown in FIG. 6 (*b*) and naturally shorter than the pitch between lines P shown in FIG. 6 (*a*).

Thereafter, a cyan color is developed while the thermal head 10 is scanned in the opposite direction to that of printing of a magenta color, that is, in the same direction as that of printing of a yellow color. A cyan color forming layer is not fixed by ultraviolet rays. An area where a cyan color is developed is in an area where magenta and yellow colors have already been fixed by the fixing lamp for a magenta color 5*b* and the fixing lamp for a yellow color 5*a* in the i-th line and the (i−1)-th line, whereby magenta and yellow colors are not developed again.

Furthermore, the area where a cyan color is developed does not include a magenta and yellow color unfixed portion in the i-th line, whereby magenta and yellow colors are not developed again in this magenta and yellow colors unfixed portion.

Description is now made of printing in the (i+1)-th line. The thermal recording paper 7 is conveyed in the forward direction by a distance of (P+Y1+Y2) shown in FIG. 6 (*d*). The printing operation of yellow, magenta and cyan colors in the (i+1)-th line is the same as that in the i-th line.

At the time of fixing a yellow color in the (i+1)-th line, the yellow color unfixed portion in the i-th line is fixed. In addition, at the time of fixing a magenta color in the (i+1)-th line, the magenta color unfixed portion in the i-th line is fixed. Since the widths of the exposed areas 13*a* and 13*b* restricted by the shading members 6*a* and 6*b* in the direction of paper delivery, that is, the longitudinal direction of the row of heating resistors 3, are set to be larger than the width in the longitudinal direction of the row of heating resistors 3, the yellow and magenta colors unfixed portion in the i-th line is completely covered with the exposed area in the (i+1)-th line, whereby no fixing remains.

The operations described in the i-th line and the (i+1)-th line are successively performed, thereby to make it possible to do color printing corresponding to one page. To prevent an overlap of all colors, print data for magenta and cyan colors must be eliminated in the first line on the downstream side in the forward direction of paper delivery, while print data for yellow and magenta colors must be eliminated in the endmost line on the upstream side in the forward direction of paper delivery.

Figure 7:
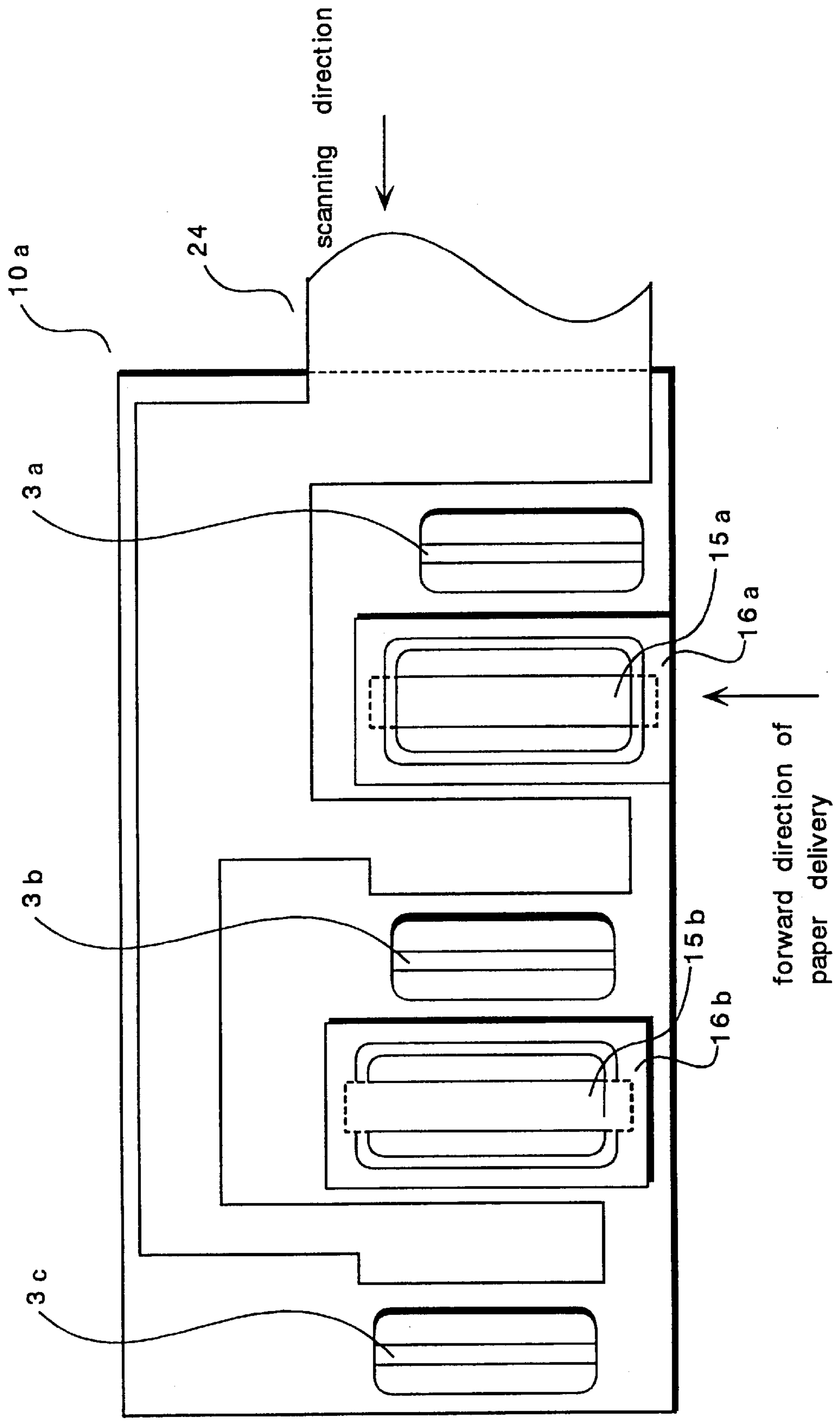
FIG. 7 is a front view showing a recording section which is a principal part of a UV-fixable thermal recording apparatus according to a second embodiment of the present invention as viewed from the thermal recording paper.

Description is now made of a second embodiment of the present invention. FIG. 7 is a front view showing a recording section which is a principal part of a UV-fixable thermal recording apparatus according to a second embodiment of the present invention as viewed from thermal recording paper, which illustrates the construction of a serial multihead having three rows of heating resistors and two fixing lamps, and FIG. 8 is a sectional side elevation thereof.

Figure 8:
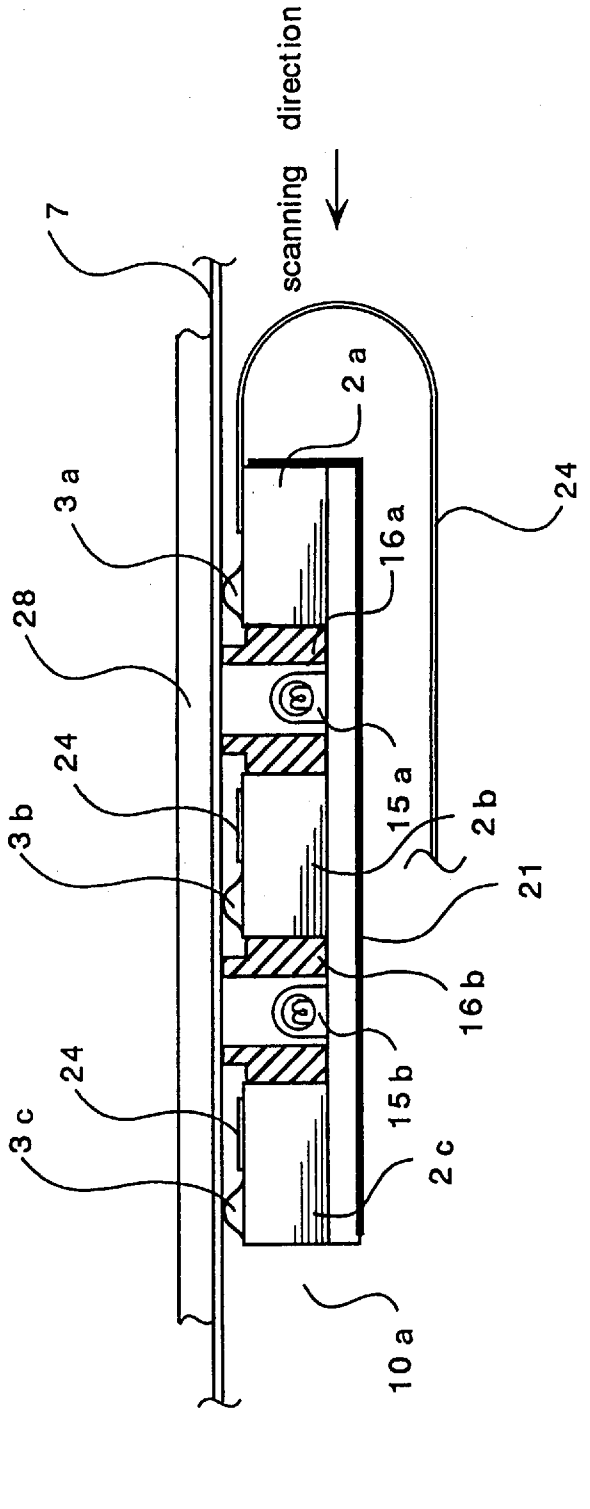
FIG. 8 is a sectional side elevation showing a principal part of the UV-fixable thermal recording apparatus according to the second embodiment of the present invention.

As shown in FIGS. 7 and 8, a thermal head 10*a* according to the second embodiment comprises a head supporting plate 21 composed of aluminum or the like, three thermal head substrates 2*a*, 2*b* and 2*c* composed of alumina or the like which are provided on the head supporting substrate 21, and rows of heating resistors 3*a* to 3*c* for doing thermal recording, each of which has a plurality of heating resistors arranged in one row which are respectively provided on the thermal head substrates 2*a* to 2*c*. The row of heating resistors 3*a*, the row of heating resistors 3*b* and the row of heating resistors 3*c* are respectively used for developing yellow, magenta and cyan colors. Power is supplied to the rows of heating resistors 3*a* to 3*c* from a flexible cable 24.

The rows of heating resistors 3*a* to 3*c*, a pair of electrodes (not shown) and the like are formed by a thin film technique or a thick film technique, as in the above-described embodiment. The number of heating resistors is determined by the width of printing area corresponding to one line and by the resolution. Sixty-four (64) heating resistors are used in a case where the resolution is 150 dpi and the line width is 10 mm, as in the above-described embodiment. The rows of heating resistors 3*a* to 3*c* are controlled in response to a recording signal by a head driving IC (not shown) provided in the leading end of the flexible cable 24.

The rows of heating resistors for yellow, magenta and cyan colors 3*a* to 3*c* are arranged in parallel in this order.

A fixing lamp 15*a* which is constituted by a ultraviolet lamp for fixing a yellow color is provided in a position which follows in the scanning direction for a yellow color of the row of heating resistors 3*a* on the head supporting plate 21. The fixing lamp 15*a* has a peak wavelength of 420 nm. In addition, a fixing lamp 15*b*, which is constituted by a ultraviolet lamp, for fixing a magenta color is provided in a position which follows the scanning direction for a magenta color of the row of heating resistors 3*b* on the head supporting plate 21. The fixing lamp 15*b* has a peak wavelength of 365 nm.

The fixing lamp for a yellow color 15*a* is arranged in parallel between the row of heating resistors for a yellow color 3*a* and the row of heating resistors for a magenta color 3*b*, and the fixing lamp for a magenta color 15*b* is arranged in parallel between the row of heating resistors for a magenta color 3*b* and the row of heating resistors for a cyan color 3*c*.

Power is supplied to the fixing lamps 15*a* and 15*b* through lamp electrode sections (not shown).

Both the fixing lamps 15*a* and 15*b* are respectively enclosed by shading members 16*a* and 16*b*, whereby their exposed areas are restricted by the shading members 16*a* and 16*b*. In order to intercept light, the shading members 16*a* and 16*b* must be brought into contact with UV-fixable thermal recording paper 7, whereby soft rubber whose friction is reduced by surface treatment is suitable for the shading members. The fixing lamps 15*a* and 15*b*, the shading members 16*a* and 16*b* and the like are constructed similarly to those shown in FIG. 3 in the first embodiment.

The width of the exposed areas restricted by the shading members 16*a* and 16*b* in the direction of paper delivery, that is, the longitudinal direction of the rows of heating resistors 3*a* to 3*c* is set to be larger than the width in the longitudinal direction of the rows of heating resistors 3*a* to 3*c*.

Furthermore, the recording apparatus is so constructed that the position of an end of the exposed area for fixing a yellow color on the upstream side in the forward direction of paper delivery is on the downstream side of the position of an end of the row of heating resisors for a yellow color 3*a* on the upstream side in the forward direction of paper delivery.

Furthermore, the recording apparatus is so constructed that the position of an end of the row of heating resistors for a magenta color 3*b* on the upstream side in the forward direction of paper delivery is on the downstream side of the position of an end of the exposed area for fixing a yellow color on the upstream side in the forward direction of paper delivery.

Furthermore, the recording apparatus is so constructed that the position of an end of the exposed area for fixing a magenta color on the upstream side in the forward direction of paper delivery is on the downstream side of the position of an end of the row of heating resistors for the magenta color 3*b* on the upstream side in the forward direction of paper delivery.

Furthermore, the recording apparatus is so constructed that the position of an end of the row of heating resistors for a cyan color 3*c* on the upstream side in the forward direction of paper delivery is on the downstream side of the position of an end of the exposed area for fixing a magenta color on the upstream side in the forward direction of paper delivery.

Figure 9:
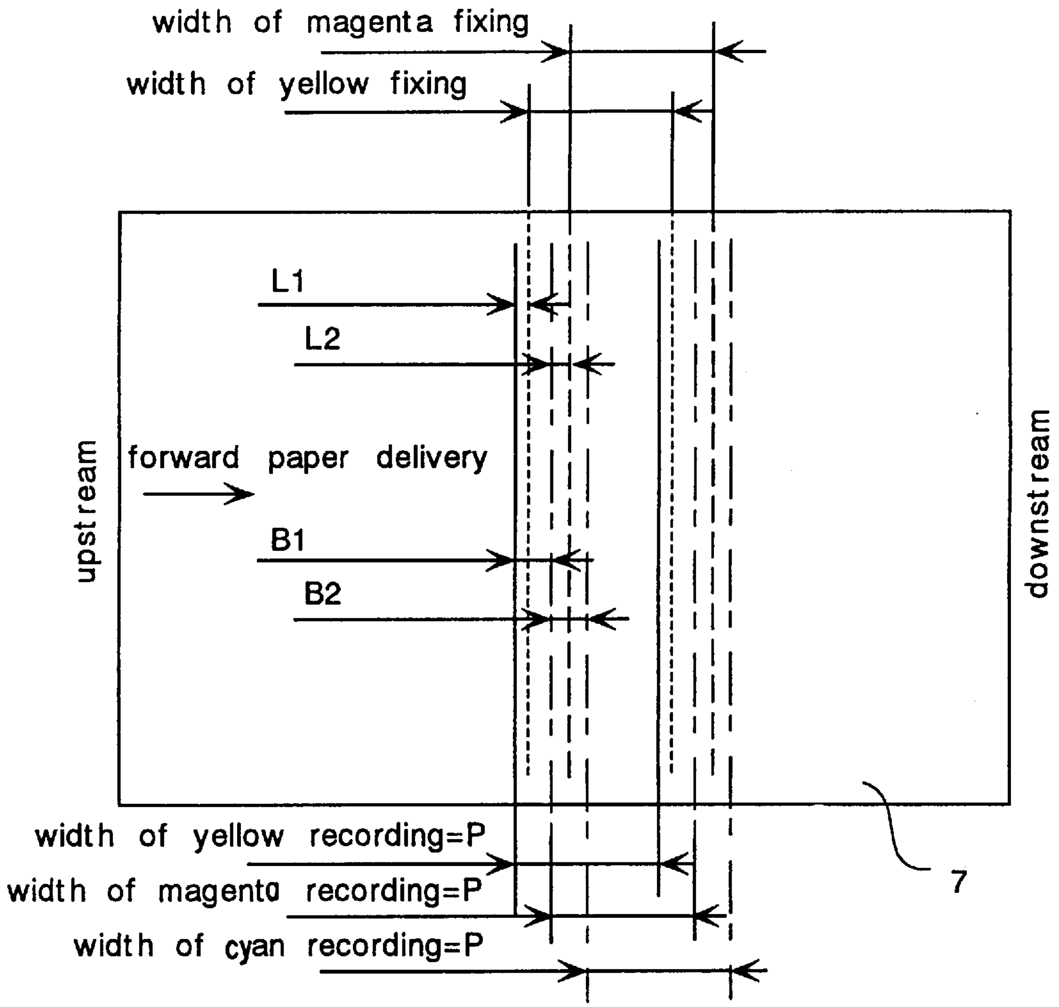
FIG. 9 is a typical view for explaining the recording states of respective colors in the UV-fixable thermal recording apparatus according to the second embodiment of the present invention.

Specifically, the rows of heating resistors 3*a* to 3*c* and the exposed areas (the fixing lamps 15*a* and 15*b* and the shading members 16*a* and 16*b*) are constructed as shown in FIG. 9. The recording apparatus is so constructed that the position of the end (on the upstream side in the forward direction of paper delivery) of the exposed area for fixing a yellow color is on the downstream side of the position of the end (on the upstream side in the forward direction of paper delivery) of the row of heating resistors for a yellow color 3*a* by a distance of L1.

Furthermore, the recording apparatus is so constructed that the position of the end (on the upstream side in the forward direction of paper delivery) of the exposed area for fixing a magenta color is on the downstream side of the position of the end (on the upstream side in the forward direction of paper delivery) of the row of heating resistors for a magenta color 3*b* by a distance of L2.

Furthermore, the recording apparatus is so constructed that the position of the end (on the upstream side in the forward direction of paper delivery) of the row of heating resistors for a magenta color 3*b* is on the downstream side of the position of the end (on the upstream side in the forward direction of paper delivery) of the row of heating resistors for a yellow color 3*a* by a distance of B1, and the position of the end (on the upstream side in the direction of paper delivery( of the row of heating resistors for a cyan color 3*c* is on the downstream side of the position of the end (on the upstream side in the forward direction of paper delivery) of the row of heating resistors for a magenta color 3*b* by a distance of B2.

L1 and L2 are values of more than zero and less than the pitch corresponding to one line P, B1 is a value of more than L1 and less than the pitch corresponding to one line P, and B2 is a value of more than L2 and less than the pitch corresponding to one line P.

Description is now made of the recording operation. Although the construction of the recording apparatus is, the same as that in the first embodiment shown in FIGS. 4 and 5, recording in one line is done by scanning the thermal head three times in the first embodiment, while recording in one line is done by scanning the thermal head once in the second embodiment.

Recording is done by scanning the thermal head 10*a* in a direction intersecting the thermal recording paper 7 while conveying the thermal recording paper 7 at the pitch corresponding to one line. Description is now made starting with recording in the i-th line on the basis of FIG. 9. FIG. 9 illustrates an area where yellow, magenta and cyan colors are developed, and an area where yellow and magenta colors are fixed.

Printing of the respective colors is done while the thermal head 10*a* is scanned in a direction from the row of heating resistors for a yellow color 3*a* to the row of heating resistors for a cyan color 3*c*. Specifically, the colors are fixed by ultraviolet rays after being developed by heat. When scanning of the thermal head 10*a* in one line is performed, a yellow color has not been fixed yet in only a portion indicated by L1 in FIG. 9 and a magenta color has not been fixed yet in a portion indicated by L2 in FIG. 9 from the positional relationship between exposed areas and the rows of heating resistors 23*a* and 23*b*. In other words, a color undeveloped portion in the succeeding line is , prevented from being previously fixed. A cyan color is not fixed by ultraviolet rays, whereby a color undeveloped portion in the succeeding line is not previously fixed. As described above, L1 and L2 are values of more than zero and less than the pitch corresponding to one line P.

Furthermore, the position of the end on the upstream side in the forward direction of paper delivery of the row of heating resistors for a magenta color 3*b* is on the downstream side of the position of the end on the upstream side of the exposed area for a yellow color by only a distance of (B1–L1) shown in FIG. 9. Accordingly, an area where a magenta color is developed is in an area where a yellow color has already been fixed by the fixing lamp for a yellow color 15*a* in the i-th line and the (i–1)-th line and is not superimposed on the above-described yellow color unfixed portion, whereby a yellow color is not developed again. B1 is a value of more than L1 and less than the pitch corresponding to one line P.

Similarly, the position of the end on the upstream side in the forward direction of paper delivery of the row of heating resistors for a cyan color 3*c* is on the downstream side of the positions of ends on the upstream side of the exposed areas for magenta and yellow colors by only (B2–L2) and (B1+B2–L1) shown in FIG. 9. Accordingly, an area where a cyan color is developed is in an area where magenta and yellow colors have already been fixed by the fixing lamp for a magenta color 15*b* and the fixing lamp for a yellow color 15*a* in the i-th line and the (i–1)-th line and is not superimposed on the above-described magenta and yellow colors unfixed portion, whereby magenta and yellow colors are not developed again. B2 is a value of more than L2 and less than the pitch corresponding to one line P.

Description is now made of printing in the (i+1)-th line. The thermal recording paper 7 is conveyed in the forward direction by a distance of P shown in FIG. 9. The printing operation of yellow, magenta and cyan colors in the (i+1)-th line is the same as that in the i-th line.

At the time of fixing a yellow color in the (i+1)-th line, the yellow color unfixed portion in the i-th line is fixed. In addition, at the time of fixing a magenta color in the (i+1)-th line, the magenta color unfixed portion in the i-th line is fixed. Since the widths of the exposed areas restricted by the shading members 16*a* and 16*b* in the direction of paper delivery, that is, the longitudinal direction of the rows of heating resistors 3*a* and 3*b* are set to be larger than the widths in the longitudinal direction of the rows of heating resistors 3*a* and 3*b*, the yellow and magenta colors unfixed portion in the i-th line is completely covered with the exposed area in the (i+1)-th line, whereby no fixing remains.

The operations described in the i-th line and the (i+1)-th line are successively performed, thereby to make it possible to do color printing corresponding to one page. Print data for magenta and cyan colors must be reduced in the first line to align the endmost line on the downstream side in the forward direction of paper delivery, while print data for yellow and magenta colors must be reduced in the lowermost line to align the endmost line on the upstream side in the forward direction of paper delivery.

Description is now made of a third embodiment of the present invention. The third embodiment achieves uniformity in light intensity distribution, high efficiency and miniaturization of a fixing lamp.

Figure 10:
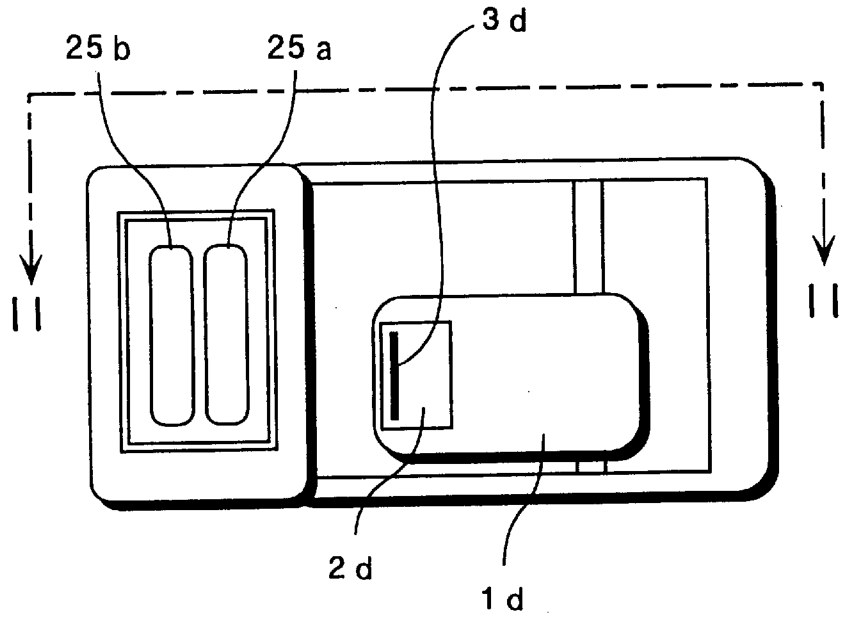
FIG. 10 is a front view showing a recording section which is a principal part of a UV-fixable thermal recording apparatus according to a third embodiment of the present invention as viewed from the thermal recording paper.
Figure 11:
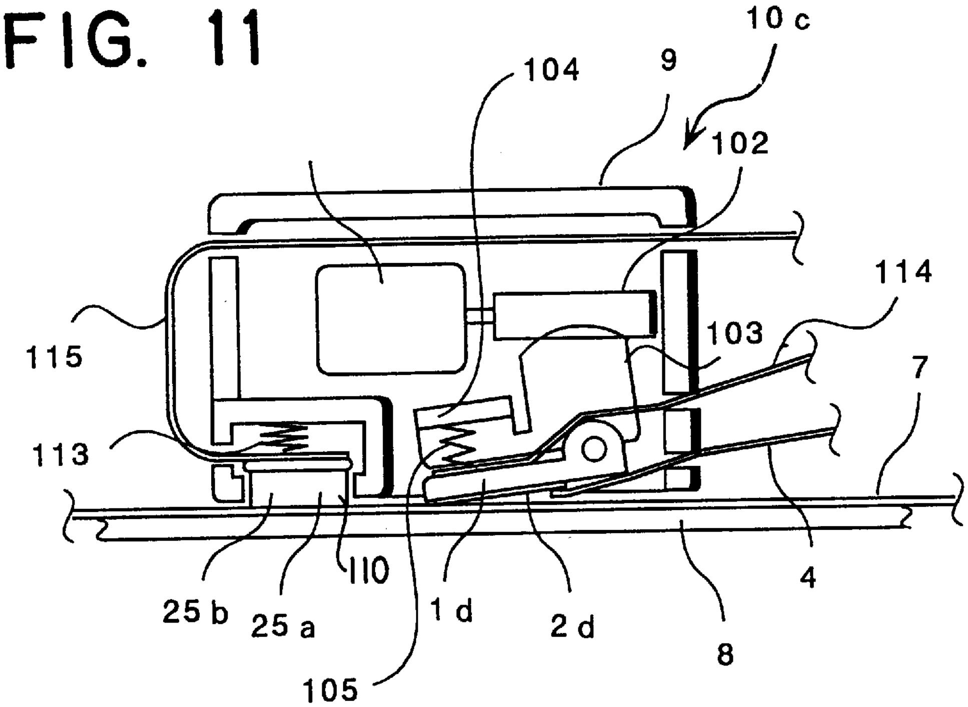
FIG. 11 is a side view as viewed from the direction of a line A—A' own in FIG. 10.

FIG. 10 is a front view showing a recording section which is a principal part of a UV-fixable thermal recording apparatus according to a third embodiment of the present invention as viewed from the thermal recording paper, and FIG. 11 is a side view as viewed from the direction of a line A—A' shown in FIG. 11, in which a thermal recording paper 7 and a platen 8 are simultaneously depicted.

A thermal head 10*c* according to the present embodiment comprises a head supporting plate 1*d* composed of aluminum or the like, a thermal head substrate 2*d* composed of alumina or the like which is provided on the head supporting plate 1*d*, and a row of heating resistors 3d for doing thermal recording which is formed as a plurality of heating resistors arranged in one row or in a staggered shape on the thermal head substrate 2*d*. Power is supplied to the row of heating resistors 3*d* from a flexible cable 4.

The row of heating resistors 3*d*, a pair of electrodes (not shown) and the like are formed by a thin film technique or a thick film technique, as in the above-described embodiments. The number of heating resistors is determined by the width of printing area corresponding to one line and by the resolution. Sixty-four (64) heating resistors are used in a case where the resolution is 150 dpi and the line width is 10 mm, as in the above-described embodiments. The row of heating resistors 3*d* is controlled in response to a recording signal by a head driving IC (not shown) provided in the leading end of the flexible cable 4.

In the present embodiment, an ultraviolet lamp 25*a* serving as a surface-shaped fixing lamp for fixing a yellow color and an ultraviolet lamp 25*b* serving as a fixing lamp for fixing a magenta color are provided in a common package in positions which follow the scanning direction of the row of heating resistors 3*d* on the head supporting plate 1*d*. The ultraviolet lamp for fixing a yellow color 25*a* has a peak wavelength of 420 nm, and the ultraviolet lamp for fixing a magenta color 25*b* has a peak wavelength of 365 nm.

The thermal head 10*c* in the present embodiment is provided with a mechanism for pressing the thermal head substrate 2*d* against the thermal recording paper 7 in addition to the thermal head substrate 2*d* (including the row of heating resistors 3*d*) and the ultraviolet lamps 25*a* which can be 25*b* for fixing the colors. Theses devices are supported by a common housing 9 and scanned over the printing area. The pressing mechanism releases the thermal head substrate 2*d* from the thermal recording paper 7 by transmitting the rotation of a motor 101 to a worm gear 102 and a worm wheel 103 to rotate a head pressing arm 104. The mechanism can again press the thermal head substrate 2 against the thermal recording paper 7 by means of a spring 105 to when the motor 101 is rotated in the backward direction.

Figure 12:
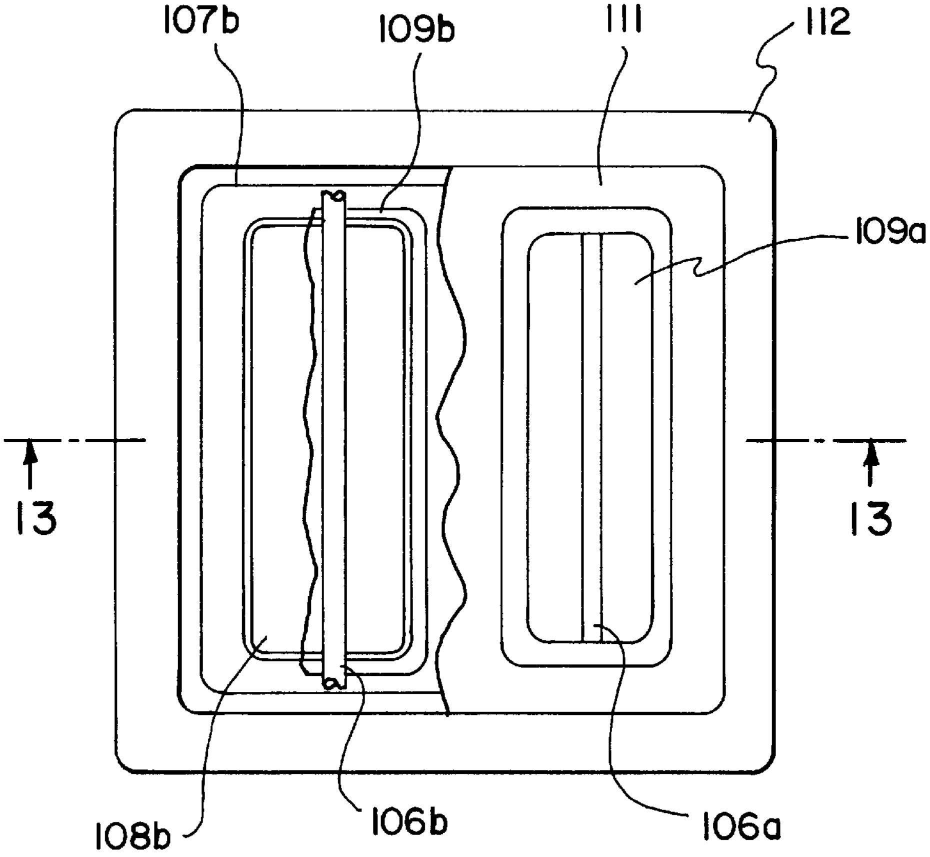
FIG. 12 is a front view for explaining a first example of the specific construction of ultraviolet lamps suitable for use in the present invention as viewed from the thermal recording paper.
Figure 13:
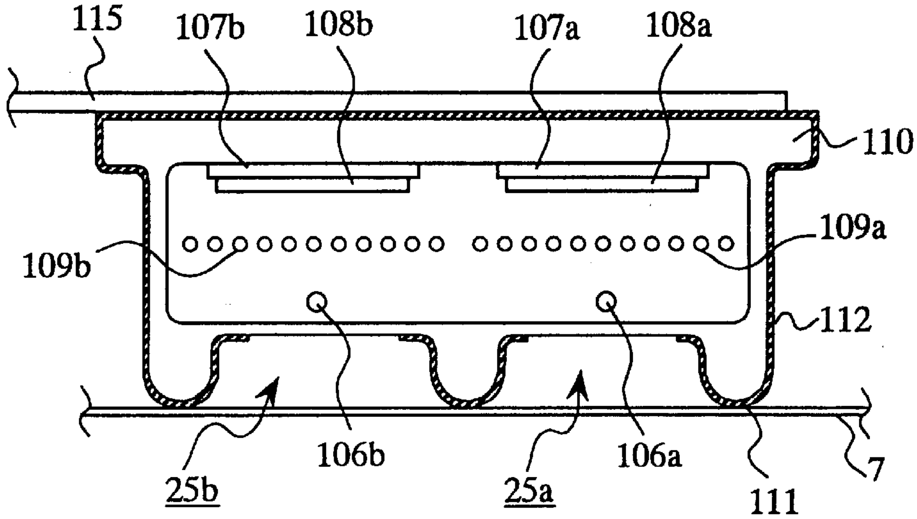
FIG. 13 is a cross-sectional view taken along a line A—A' shown in FIG. 12.

FIGS. 12 and 13 are diagrams for explaining a first embodiment of the specific construction of the ultraviolet lamps 25*a* and 25*b* suitable for use in the present invention, where FIG. 12 is a front view as viewed from thermal recording paper, and FIG. 13 is a cross-sectional view taken along a line A—A' shown in FIG. 12. As shown in FIGS. 12 and 13, filaments 106*a* and 106*b* serving as a plurality of cathode electrodes are stretched on the side of the head toward the thermal recording paper 7. The filaments 106*a* and 106*b* serving as the cathode electrodes use a coating of a tungsten conductor having a diameter of several tens of microns with oxides such as barium, strontium and calcium. The filaments 106*a* and 106*b* are under such tension that there is no slack in them when they thermally expand due to energization and heating.

Two anode electrodes 107*a* and 107*b*, which along with the filaments 106*a* and 106*b*, respectively constitute counter electrodes, are provided on surfaces, which are opposite to the filaments 106*a* and 106*b* of the fluorescent lamps 25*a* and 25*b*. The one anode electrode 107*a* is for fixing and emitting a yellow color, and the other anode electrode 107*b* is for fixing and emitting a magenta color. The counter electrodes respectively comprising the filaments 106*a* and 106*b* and the anode electrodes 107*a* and 107*b* are positioned approximately in parallel with the row of heating resistors 3*d* shown in FIG. 10.

Furthermore, a fluorescent material for fixing and emitting a yellow color 108*a* which emits ultraviolet rays having a peak wavelength of 420 nm and a fluorescent material for fixing and emitting a magenta color 108*b* which emits ultraviolet rays having a peak wavelength of 365 nm are respectively formed over an area shape so as to constitute a section emitting light over a surface area on the anode electrodes 107*a* and 107*b*.

Graphite and aluminum are used for the anode electrodes 107*a* and 107*b*. The fluorescent materials 108*a* and 108*b* can emit ultraviolet rays having a wavelength range close to a desirable wavelength range by adding impurities as an activator to zinc oxide and sulfides. A thick film technique, for example, can be used for forming the fluorescent materials 108*a* and 108*b*. Paste obtained by kneading fluorescent powder and a vehicle or carrier material is subjected to screen printing to thicknesses of 10 to 20 microns, and is then sintered at temperatures of 400° to 500° C. to obtain the fluorescent materials 108*a* and 108*b*.

Grid electrodes 109*a* and 109*b* are provided between the fluorescent materials 108*a* and 108*b*, and the filaments 106a and 106*b*. The grid electrode is obtained by etching stainless steel or the like, having a thickness of approximately 50 microns into a mesh shape. The filaments 106*a* and 106*b*, the grids 109*a* and 109*b*, the fluorescent materials 108*a* and 108*b*, and the anodes 107*a* and 107*b* are sealed into a glass package 110, and the inside of the glass package 110 is kept in a vacuum state.

Therefore, description is made of the light emitting operation of the ultraviolet lamps 25*a* and 25*b* of such construction. The filaments 106*a* and 106*b*, when energized and heated, emit thermoelectrons at a temperature of approximately 500° C. The thermoelectrons are drawn to the grid electrodes 109*a* and 109*b* and the anode electrodes 107*a* and 107*b*. The thermoelectrons are uniformly dispersed by grids of the grids electrodes 109*a* and 109*b*, and are further accelerated, to collide with the fluorescent materials 108*a* and 108*b* on the anode electrodes 107*a* and 107*b*. The fluorescent materials 108*a* and 108*b* convert energy into light by the collision, to emit ultraviolet rays in a surface shape.

In this example, the movement of the thermoelectrons can be controlled by the potentials at the grid electrodes 109*a* and 109*b* and the anode electrodes 107*a* and 107*b* , thereby making it possible for the arbitrary fluorescent materials 108*a* and 108*b* to individually emit light. Further, it is possible to freely set a light emitting area by the shapes of the anode electrodes 107*a* and 107*b* and the fluorescent materials 108*a* and 108*b*.

It should be noted that the longitudinal direction of the anode electrodes 107*a* and 107*b*, the grid electrodes 109*a* and 109*b* and the filaments 106*a* and 106*b* is approximately parallel to the row of heating resistors 3*d* on the thermal head substrate 2*d* shown in FIG. 10, and the lengths in the longitudinal direction of the anode electrodes 107*a* and 107*b*, the grid electrodes 109*a* and 109*b* and the filaments 106*a* and 106*b* are set to be slightly larger than that of the row of heating resistors 3*d*, whereby the distribution of the thermoelectrons reaches uniformity in the longitudinal direction of the electrodes. In addition, the thermoelectrons are uniformly distributed in a direction perpendicular to the longitudinal direction of the electrodes by the grid electrodes 109*a* and 109*b*. Consequently, the light intensity of ultraviolet rays irradiated onto the thermal recording paper 7 from the ultraviolet lamps 5*a* and 5*b* with such construction is nearly uniform.

Furthermore, elements (electrodes and fluorescent materials) constituting the ultraviolet lamps 25*a* and 25*b* of such embodiment are sealed into a common glass package 110. A raised-shaped bank 111 is formed around the glass package 110 on the side of its exposed surface, and the periphery of the bank 111 (excluding the exposed surface of the glass package 110 and the periphery and the rear surface of the glass package 110 covered with a reflecting layer 112 composed of metal or the like in a shading manner, as shown in FIG. 13. This can be performed by electroless plating, evaporation and the like, by masking only the exposed surface.

Consequently, the bank 111 on the side of the exposed surface of the glass package 110 lightly abuts against the thermal recording paper 7 due to a plate spring 113 or the like, so that the glass package 110 of the ultraviolet lamps 25*a* and 25*b* is made movable only in a direction perpendicular to the thermal recording paper 7, as shown in FIG. 11. Consequently, undesirable light from the ultraviolet lamps 25*a* and 25*b* is prevented from leaking without providing separate components, such as a skirt made of rubber, thereby making it possible to restrict exposed areas to predetermined portions to be fixed on the thermal recording paper 7. Since the friction between the glass package 110 and the thermal recording paper 7 is smaller than that of rubber, no problems occur in recordings made while the lamp is sliding.

The width of the exposed area in the direction of paper delivery (that is, the longitudinal direction of the row of heating resistors 3*d*) is set to be larger than the width in the longitudinal direction of the row of heating resistors 3*d*. In addition, the ultraviolet lamps 25*a* and 25*b* are so arranged that the position of an end (on the upstream side in the forward direction of paper delivery) of the exposed area is (on the downstream side of the position of an end on the upstream side in the forward direction of paper delivery) of the row of heating resistors 3*d*.

Flexible film-shaped heat radiating members 114 and 115 composed of aluminum or copper having high thermal conductivity are respectively mounted of the head supporting plate 1*d* on the serial thermal head substrate 2*d* and on the rear surfaces of the glass package 110 of the ultraviolet lamps 25*a* and 25*b*. Even if the thermal head substrate 2*d* and the ultraviolet lamps 25*a* and 25*b* are moved at the time of recording, generated heat is efficiently radiated through the heat radiating members 114 and 115. Specifically, the heat radiating members 114 and 115 are separately provided to prevent heat accumulated in the thermal head substrate 2*d* from being conducted to the ultraviolet lamps 25*a* and 25*b* which are in close proximity thereto. When a cooling fan is mounted inside the recording apparatus, the heat radiating members 114 and 115 are cooled, thereby to making it possible to efficiently cool the thermal head substrate 2*d* irrespective of the movement of the thermal head substrate 2*d* and the ultraviolet lamps 25*a* and 25*b*.

Description is now made of the recording operation. Although the construction of the recording apparatus is the same as that in the first embodiment shown in FIGS. 4 and 5, the scanning directions of heads for printing yellow and cyan colors and the scanning direction of a head for printing a magenta color are opposite to each other in the first embodiment, while all the scanning directions of heads for printing yellow, magenta and cyan colors are the same in the present embodiment.

Figure 14:
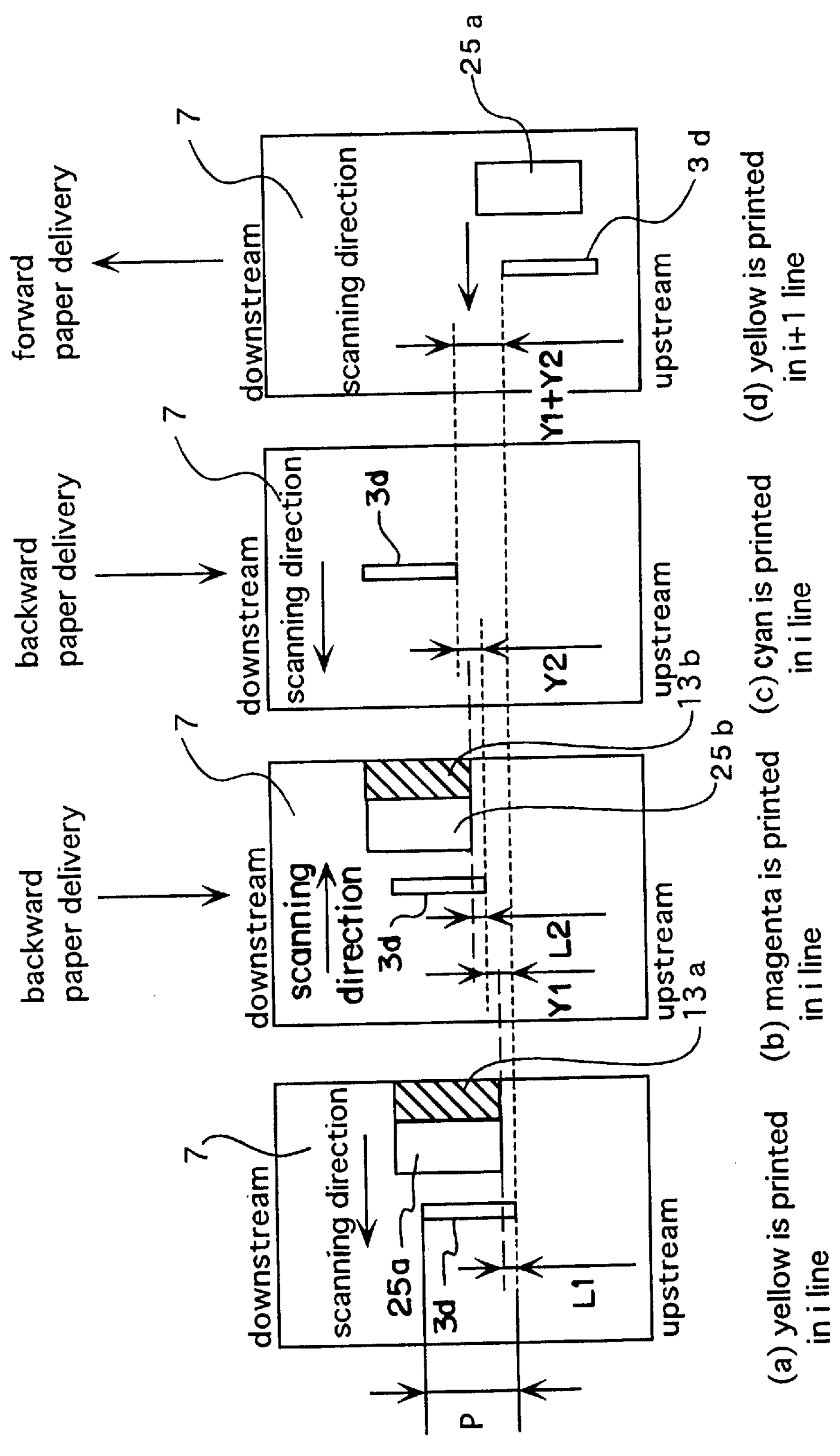
FIG. 14 is a typical view for explaining the recording states of respective colors in the UV-fixable thermal recording apparatus according to the third embodiment of the present invention.

Recording is done by scanning the thermal head lOc in a direction intersecting the thermal recording paper 7 while conveying the thermal recording paper 7 at the pitch corresponding to one line. The description is now made starting with recording in the i-th line on the basis of FIG. 14. FIG. 14 illustrates the relationship between the width of recording are and the width of the exposed area in the direction of paper delivery in a case where yellow, magenta and cyan colors are printed, assuming that the thermal recording paper 7 is fixed.

First, a yellow color is developed and fixed while the thermal head 10*c* is scanned in a direction from the ultraviolet lamp for a yellow color 25*a* to the row of heating resistors 3*d*. Specifically, a yellow color is fixed by ultraviolet rays after being developed by heat. When a yellow color corresponding to one line is developed and fixed, only a portion indicated by L1 in FIG. 14 (*a*), has not been fixed due to the positional relationship between the exposed area 13*a* for yellow color and the row of heating resistors 3*d*. In other words, a color undeveloped portion in the succeeding line is prevented from being previously fixed.

The thermal recording paper 7 is then conveyed in the backward direction by Y1 shown in FIG. 14(*b*). Y1 is a distance longer than L1 shown in FIG. 14 (*b*) and naturally shorter than the pitch between lines P corresponding to the length of the row of heating resistors 3*d*.

Thereafter, a magenta color is developed and fixed while the thermal head 10*c* is scanned in a direction from the fixing lamp for a magenta color 25*b* to the row of heating resistors 3*d*, similarly to a yellow color. At this time, an area where heat is generated for developing a magenta color is overlapped with an area where heat is generated for developing a yellow color, excluding the width of Y1 on the upstream side in the direction of delivery of the thermal recording paper 7. However, this overlapped portion becomes an area where a yellow color has already been developed and fixed by the ultraviolet lamp for a yellow color 25*a*, whereby a yellow color is not developed again.

Furthermore, an area where a magenta color is developed does not include a yellow color unfixed portion in the i-th line (a portion having the width L1), whereby a yellow color is not developed again in this yellow color unfixed portion.

When a magenta color corresponding to one line is developed and fixed, only a portion indicated by L2 in FIG. 14 (*b*) has not been fixed yet due to the positional relationship between an exposed area 13*b* for a magenta color and the row of heating resistors 3*d*. In other words, a color undeveloped portion in the succeeding line is prevented from being previously fixed.

The thermal recording paper 7 is then conveyed in the backward direction by Y2 shown in FIG. 14 (*c*). Y2 is a distance longer than L2 shown in FIG. 14 (*c*) and naturally shorter than the pitch between lines P.

Thereafter, a cyan color is developed while the thermal head 10*c* is scanned. A cyan color forming layer is not fixed by ultraviolet rays. An area where a cyan color is developed is in an area where magenta and yellow colors have already been fixed by the fixing lamp for a magenta color and the fixing lamp for a yellow color, that is, the ultraviolet lamps 25*a* and 25*b* in the i-th line and the (i−1)-th line, whereby magenta and yellow colors are not developed again.

Furthermore, the area where a cyan color is developed does not include a magenta and yellow colors unfixed portion in the i-th line, whereby magenta and yellow colors are not developed again in this magenta and yellow colors unfixed portion.

A description is now of printing in the (i+1)-th line. The thermal recording paper 7 is conveyed in the forward direction by a distance of (P+Y1+Y2) shown in FIG. 14 (*d*). The printing operation of yellow, magenta and cyan colors in the (i+1)-th line is the same as that in the i-th line.

At the time of fixing a yellow color in the (i+1)-th line, the yellow color unfixed portion in the i-th line is fixed. In addition, at the time of fixing a magenta color in the (i+1)-th line, the magenta color unfixed portion in the i-th line is fixed. Since the widths of the exposed areas 13*a* and 13*b* restricted by the bank 111 and the reflecting layer 112 composed of metal or the like (in the direction of paper delivery, that is, the longitudinal direction of the row of heating resistors 3*d*) are set to be larger than the width in the longitudinal direction of the row of heating resistors 3*d*, the unfixed portions of the yellow and magenta colors in the i-th line are completely covered with the exposed area in the (i+1)-th line, whereby no fixing remains to be done.

The operations described in the i-th line and the (i+1)-th line are successively performed, thereby making it possible to do color printing corresponding to one page. Print data for magenta and cyan colors must be reduced in the first line to align the endmost line on the downstream side in the forward direction of paper delivery, while print data for yellow and magenta colors must be reduced in the lowermost line to align the endmost line on the upstream side in the forward direction of paper delivery.

Figure 15:
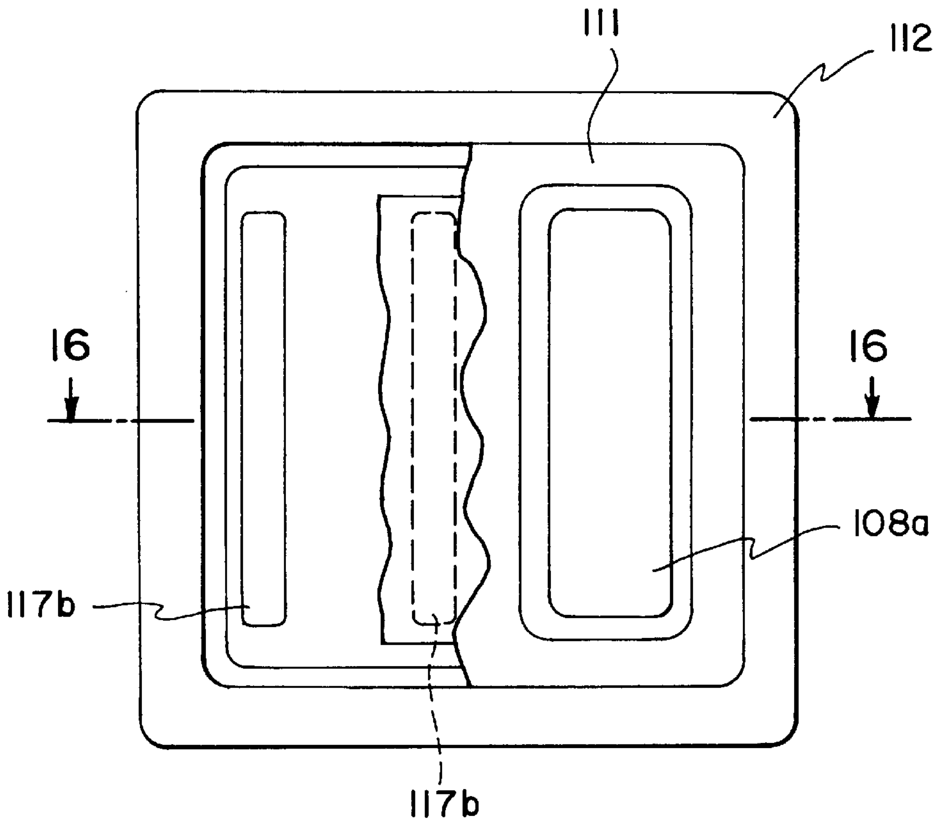
FIG. 15 is a front view for explaining a second example of the specific construction of ultraviolet lamps suitable for use in the present invention as viewed from the thermal recording paper.
Figure 16:
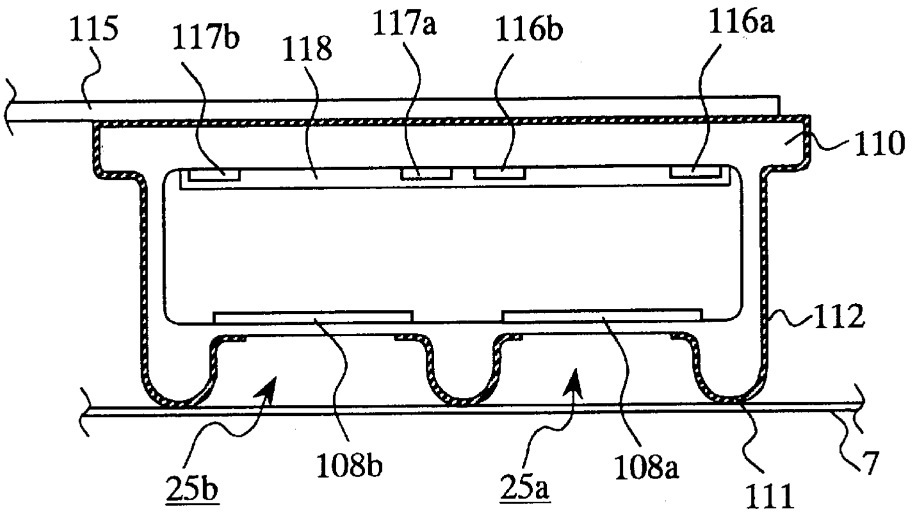
FIG. 16 is a cross-sectional view taken along a line A—A' shown in FIG. 15.

A description is now given of a second example of fixing lamps suitable for use in the present invention with reference to FIGS. 15 and 16. FIG. 15 is a partially broken front view as viewed from the thermal recording paper, and FIG. 16 is a cross-sectional view taken along a line A—A' shown in FIG. 15, as in the example shown in FIGS. 12 and 13. The same components as those shown in FIGS. 12 and 13 are assigned the same reference numerals and hence, the description thereof is not repeated.

In the ultraviolet lamps 25*a* and 25*b*, two sets of counter electrodes 116*a* and 116*b* and 117*a* and 117*b*, which are opposed to each other, are formed on the bottom surface inside of a glass package 110. These electrodes are covered with a dielectric body 118. The longitudinal direction of the electrodes 116*a* and 116*b* and 117*a* and 117*b* are approximately parallel to a row of heating resistors 3*d*, and the lengths of the electrodes are set to be slightly larger than that of the row of heating resistors 3*d*. Fluorescent materials 108*a* and 108*b* are respectively applied to the inside of the glass package 110 under the counter electrodes.

Fluorescent materials 108*a* and 108*b* are respectively a fluorescent material for fixing a yellow color which emits ultraviolet rays having the same peak wavelength of 420 nm as that in the example shown in FIGS. 12 and 13, and a fluorescent material for fixing a magenta color which emits ultraviolet rays having the same peak wavelength of 365 nm. The fluorescent materials can emit ultraviolet rays having a wavelength range close to a desired wavelength range by adding impurities as an activator to zinc oxide and sulfides. A thick film technique, for example, can be used for forming the fluorescent materials. Paste obtained by kneading fluorescent powder and a carrier or vehicle material is subjected to screen printing to thicknesses of 10 to 20 microns, and is then sintered at temperatures of 400° to 500° C. to obtain the fluorescent materials. The glass package 110 is filled with gasses such as He, Kr and Xe. A trace amount of mercury vapor may, in some cases, be included thereto.

The ultraviolet lamps 25*a* and 25*b* of such construction performs a light emitting operation by applying an AC voltage in the neighborhood of 200 V as required to the counter electrodes 116*a* and 116*b* and 117*a* and 117*b*. Specifically, if an AC voltage is applied, discharges are induced between both the electrodes, whereby ultraviolet rays are radiated from the gases with which the glass package 110 is filled. The fluorescent materials 108*a* and 108*b* convert energy caused by the collision of ultraviolet rays into light having a predetermined wavelength (a peak wavelength of 420 nm and a peak wavelength of 365 nm) to radiate desired ultraviolet rays. The distance between the electrodes may be changed, thereby making it possible to change the light emitting area. Since the longitudinal direction of the electrodes is approximately parallel to the row of heating resistors 3*d* on the thermal head substrate 2*d*, the distribution of electrons reaches uniformity in the longitudinal direction of the electrodes. Consequently, the light intensity reaches uniformity.

The method of intercepting light and the construction and the operations of components other than the fixing lamps are the same as those in the third embodiment and hence, the description thereof is not repeated.

Figure 17:
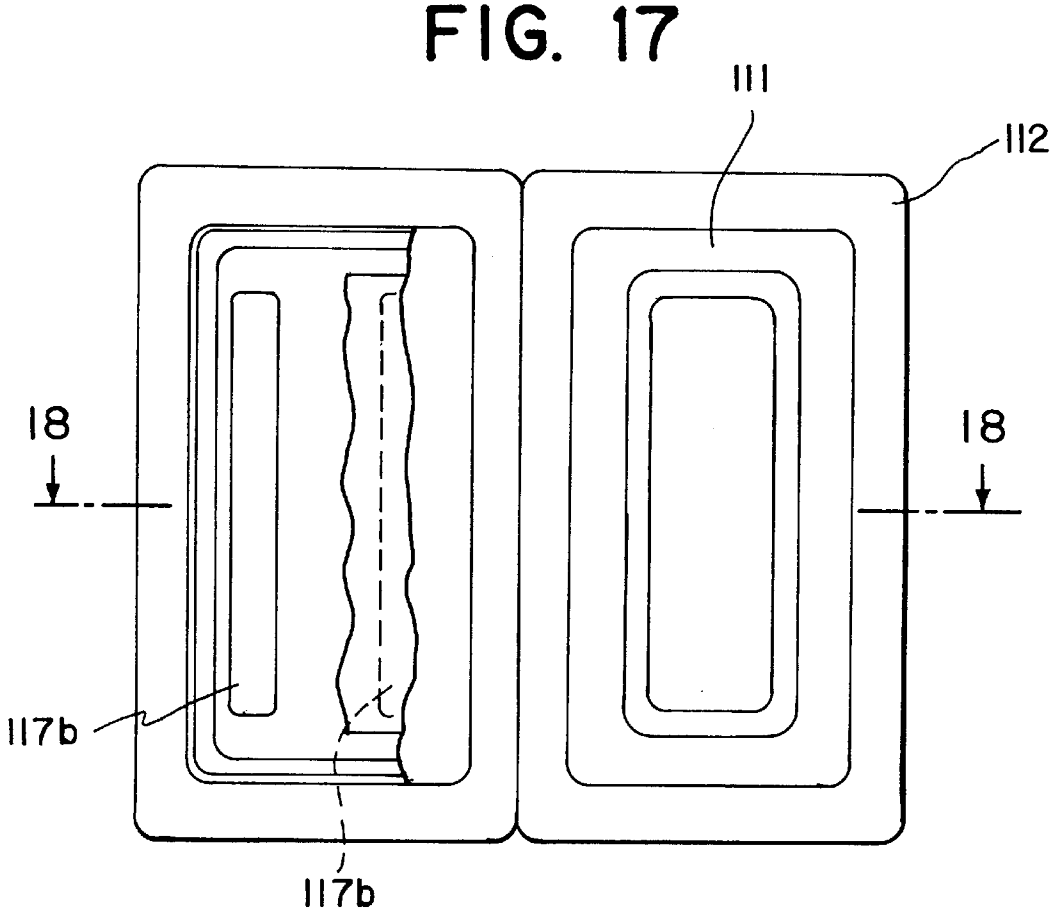
FIG. 17 is a front view for explaining a third example of the specific construction of ultraviolet lamps suitable for use in the present invention as viewed from the thermal recording paper.
Figure 18:
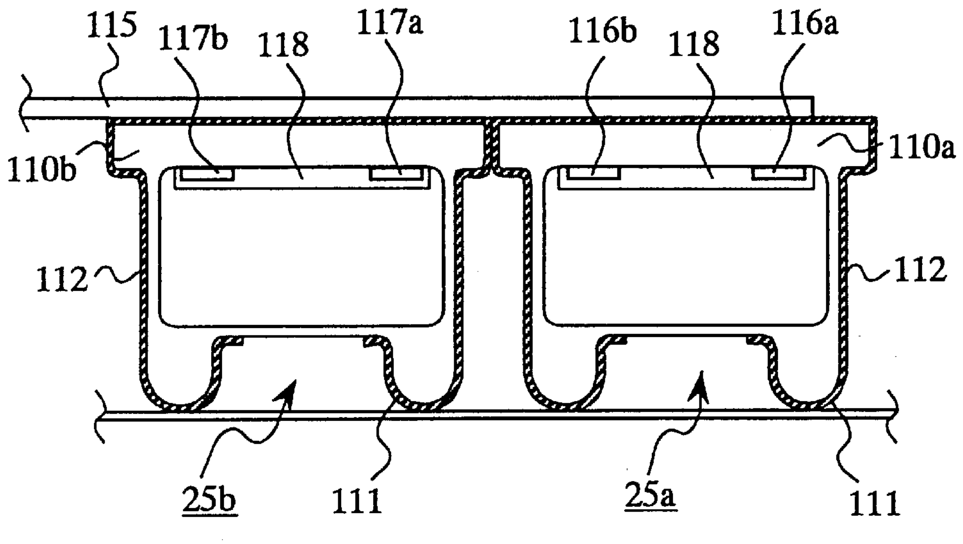
FIG. 18 is a cross-sectional view taken along a line A—A' shown in FIG. 17.

A description is now given of a third example of fixing lamps suitable for use in the present invention with reference to FIGS. 17 and 18. FIGS. 17 and 18 are the same as FIGS. 12 and 13 in the first example, and FIGS. 15 and 16 in the second example, where FIG. 17 is a partially broken front view as viewed from the thermal recording paper, and FIG. 18 is a cross-sectional view taken along a line A—A' shown in FIG. 17. The same components as those shown in FIGS. 12 and 13 are assigned the same reference numerals and hence, the description thereof is not repeated.

The third example is common to the second example except that different glass packages are used for each color, for example, a glass package 110*a* for fixing a yellow color and a glass package 110*b* for fixing a magenta color. The glass packages 110*a* and 110*b* are filled with gases for radiating ultraviolet rays having wavelengths required for fixing (a peak wavelength of 420 nm and a peak wavelength of 365 nm) when discharges are induced between two sets of counter electrodes 116*a* and 116*b*, and 117*a* and 117*b*. Therefore, different glass packages are used for each color in the present example, whereby emission of light having a predetermined wavelength is obtained by the gases, thereby eliminating the necessity of the fluorescent materials as in the above-described examples.

Figure 19:
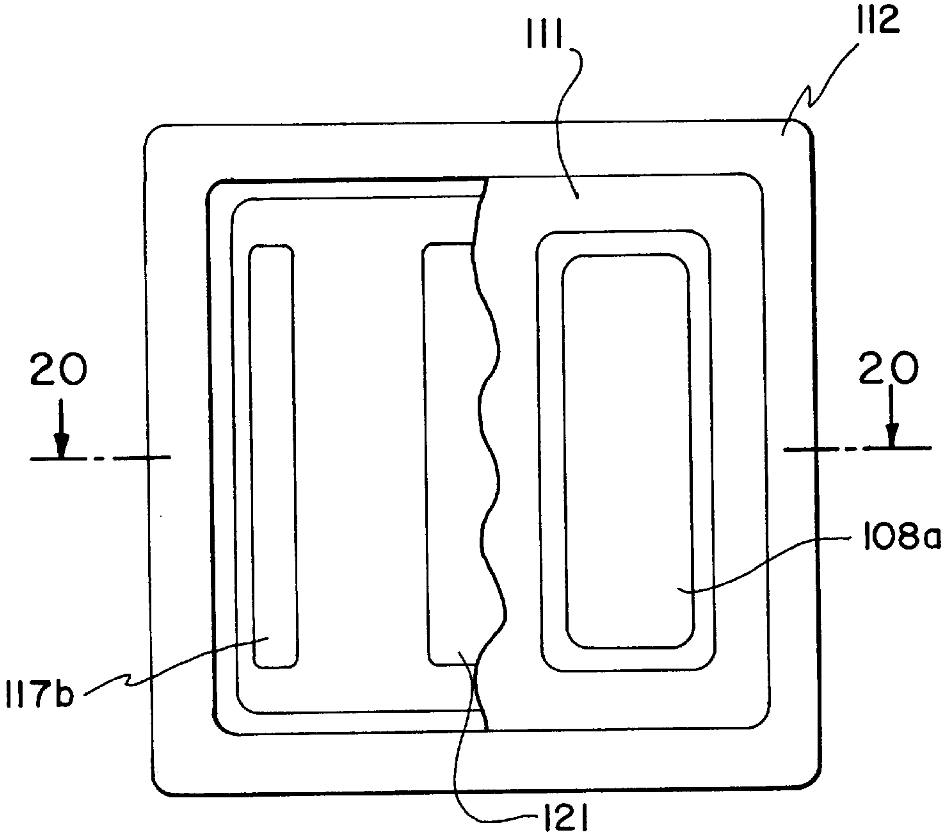
FIG. 19 is a front view for explaining a fourth example of the specific construction of ultraviolet lamps suitable for use in the present invention as viewed from the thermal recording paper.
Figure 20:
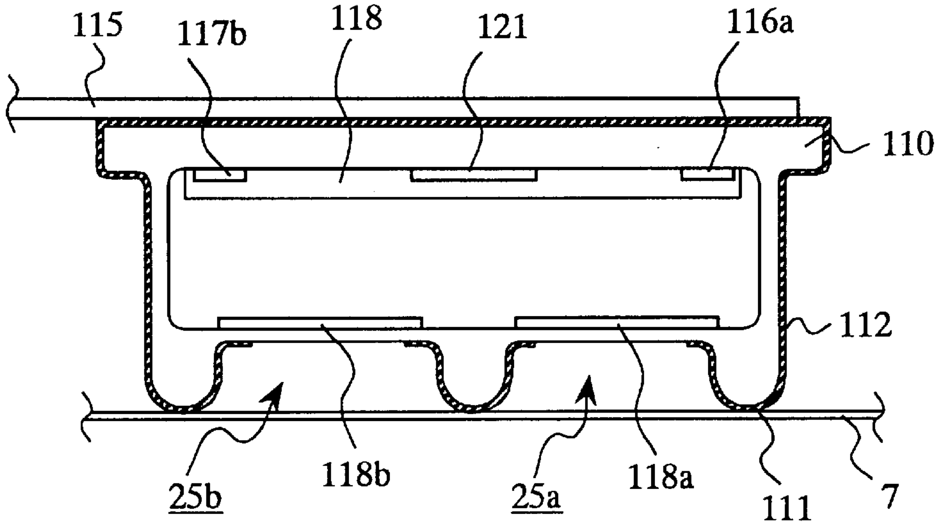
FIG. 20 is a cross-sectional view taken along a line A—A' shown in FIG. 19.

FIGS. 19 and 20 illustrate a fourth example of fixing lamps suitable for use in the present invention. FIGS. 19 and 20 are also the same as FIGS. 12 and 13 in the first example, and FIGS. 17 and 18 in the third example, where FIG. 19 is a partially broken front view as viewed from the thermal recording paper, and FIG. 20 is a cross-sectional view taken along a line A—A' shown in FIG. 19.

The fourth example is common to the second example except that the electrodes 116*b* and 117*a*, which are of the same polarity in the two sets of counter electrodes 116*a* and 116*b* and 117*a* and 117*b* in the second example, are changed into a common electrode 121. This makes it possible to make the fixing lamps more compact.

Figure 21:
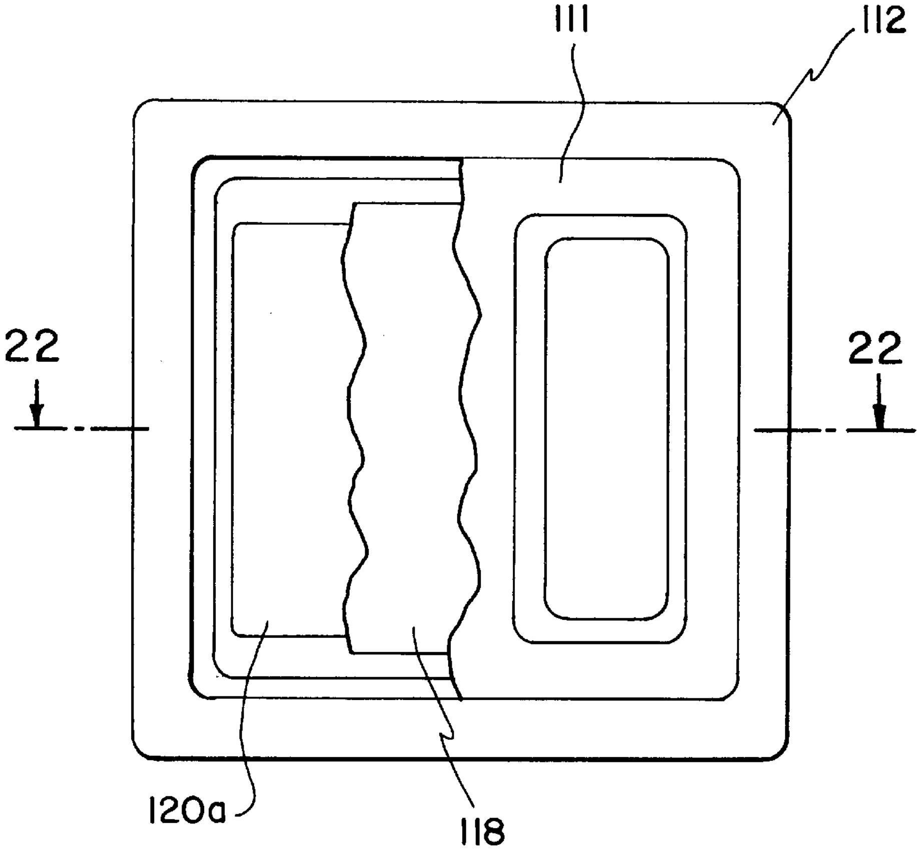
FIG. 21 is a front view for explaining a fifth example of the specific construction of ultraviolet lamps suitable for use in the present invention as viewed from the thermal recording paper.
Figure 22:
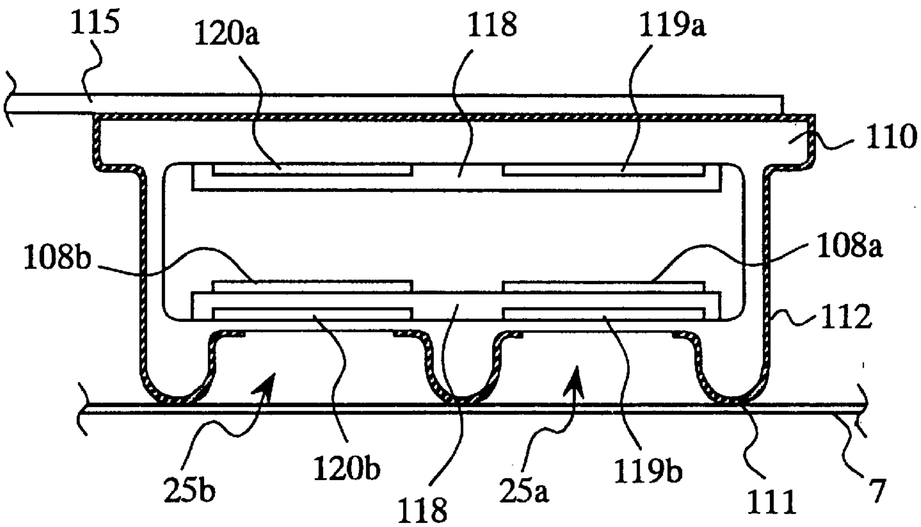
FIG. 22 is a cross-sectional view taken along a line A—A' shown in FIG. 21.

FIGS. 21 and 22 illustrate a fifth example of fixing lamps suitable for use in the present invention. FIGS. 21 and 22 are also the same as FIGS. 12 and 13 in the first example and FIGS. 19 and 20 in the fourth example, where FIG. 21 is a partially broken front view as viewed from the thermal recording paper, and FIG. 22 is a cross-sectional view taken along a line A—A' shown in FIG. 21.

In this example, respective ones of the electrodes 119*a* and 120*a* out of two sets of the counter electrodes 119*a* and 119*b* and 120*a* and 120*b* which are opposite to each other, are formed on the bottom surface inside of the glass package 110 of the ultraviolet lamps 259*a* and 25*b*, and are further covered with a dielectric body 118. The longitudinal direction of the electrodes 119*a* and 120*a* is approximately parallel to the row of heating resistors 3*d*, and the lengths of the electrodes 119*a* and 120*a* are approximately the same as that of the row of heating resistors 3*d*. Transparent electrodes 119*b* and 120*b* composed of translucent conductive oxides such as $SnO_2$ and ITO (Indium Tin Oxide) are formed inside of the glass package 110 above the two electrodes 119*a* and 120*a*, and are covered with a dielectric body 118. The same fluorescent materials 108*a* and 108*b* as those in the first example and the second example are applied to the dielectric body 118 as a fluorescent material for fixing a yellow color and a fluorescent material for fixing a magenta color these materials are arranged so as to be opposite to the respective electrodes. The glass package 110 is filled with gases such as He, Kr and Xe. A trace amount of mercury vapor may, in some cases, be included thereto.

The ultraviolet lamps 25*a* and 25*b* of such construction perform a light emitting operation by applying an AC voltage in the neighborhood of 200 V, as required, to the transparent electrodes 119*b* and 120*b* and the electrodes 119*a* and 120*a*. Specifically, if an AC voltage is applied, discharges are induced between the transparent electrodes 119*b* and 120*b* and the electrodes 119*a* and 120*a*, whereby, ultraviolet rays are radiated from the gases with which the glass package 110 is filled. The fluorescent materials 108*a* and 108*b* convert energy caused by the collision of ultraviolet rays with the gas into light having a predetermined wavelength (a peak wavelength of 420 nm and a peak wavelength of 365 nm) say as to radiate desired ultraviolet rays. The distance between the electrodes may be changed in order to make it possible to change the size of the light emitting area. Since the longitudinal direction of the electrodes is approximately parallel to the row of heating resistors 3*d* on the thermal head substrate 2*d*, the distribution of electrons is uniform in the longitudinal direction of the electrodes. Consequently, the light intensity is uniform.

The method of intercepting light and the construction and the operations of components other than the fixing lamps are the same as those in the first example and hence, the description thereof is not repeated.

Figure 23:
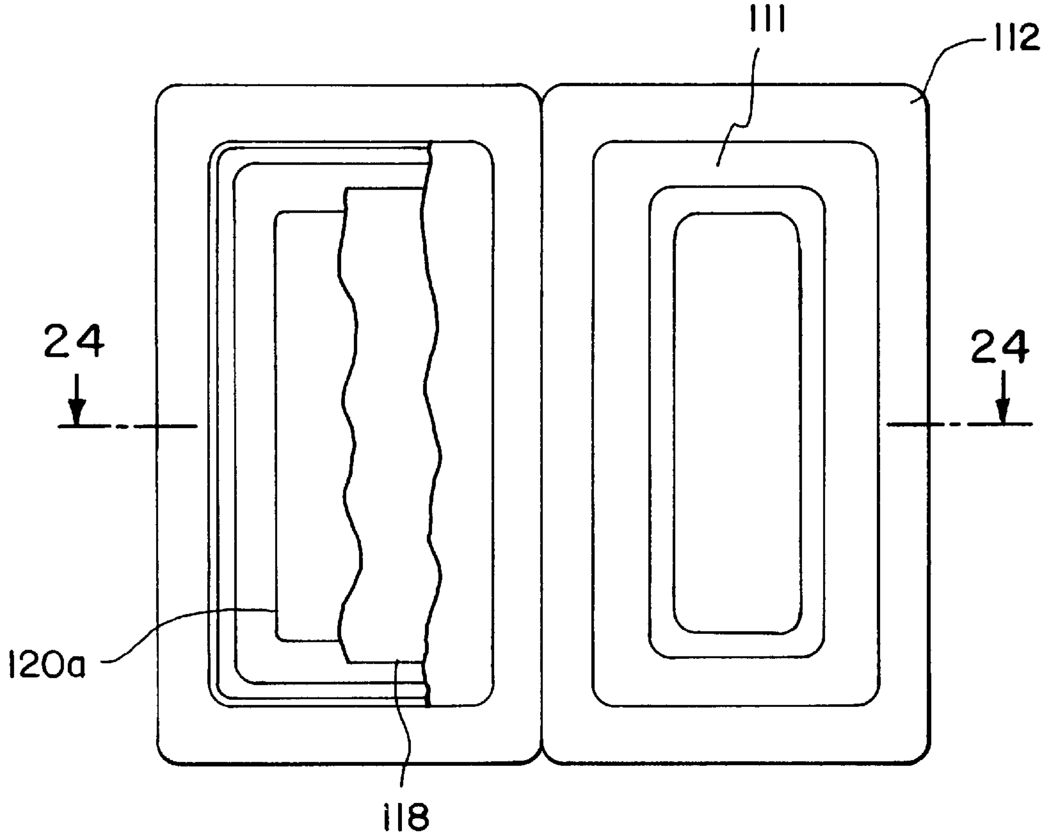
FIG. 23 is a front view for explaining a sixth example of the specific construction of ultraviolet lamps suitable for use in the present invention as viewed from the thermal recording paper.
Figure 24:
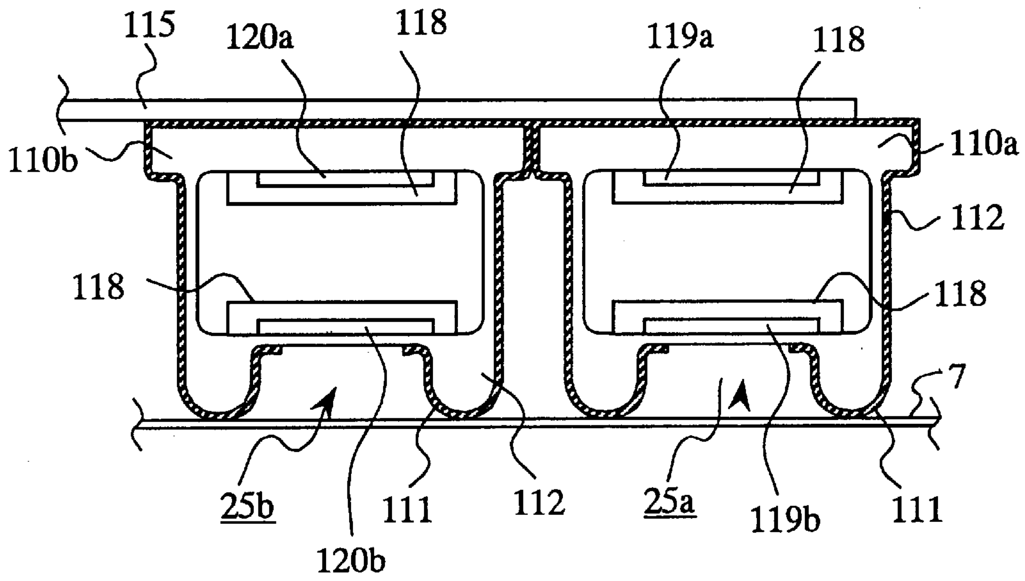
FIG. 24 is a cross-sectional view taken along a line A—A' shown in FIG. 23.
Figure 25:
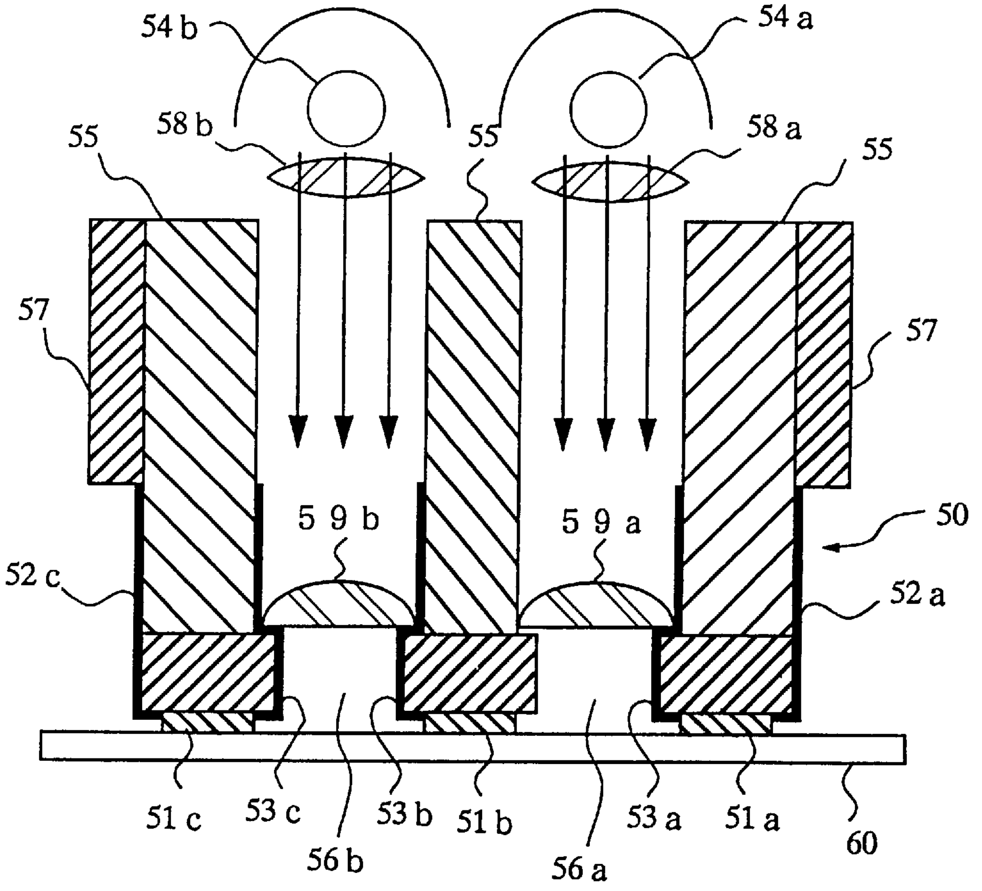
FIG. 25 PRIOR ART
FIG. 25 is a cross-sectional view showing a conventional multi-head type recording apparatus.
Figure 26:
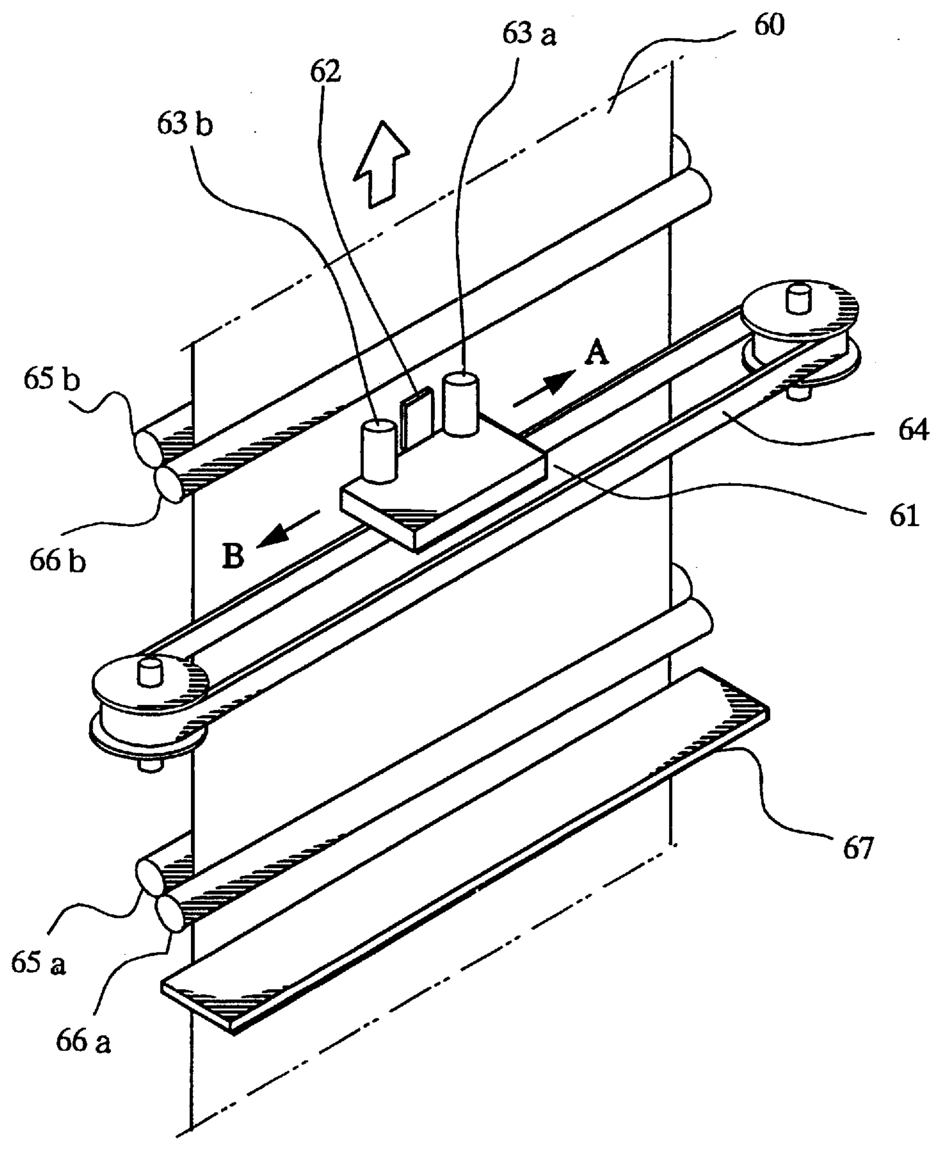
FIG. 26 PRIOR ART
FIG. 26 is a perspective view showing a conventional serial thermal head type recording apparatus.
Figure 27A:
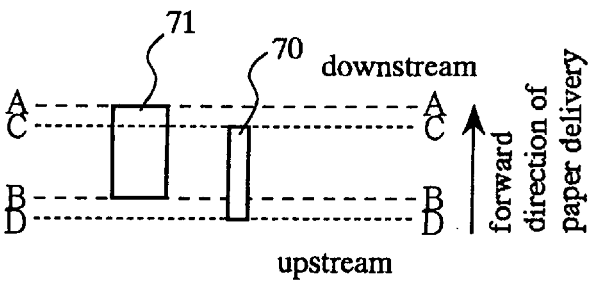
FIG. 27A PRIOR ART
FIGS. 27A to 27I are diagrams for explaining the positional relationship between a row of heating resistors and a fixing lamp in a conventional serial thermal head.
Figure 27B:
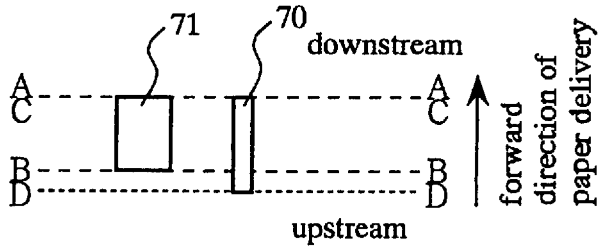
FIG. 27B PRIOR ART
Figure 27C:
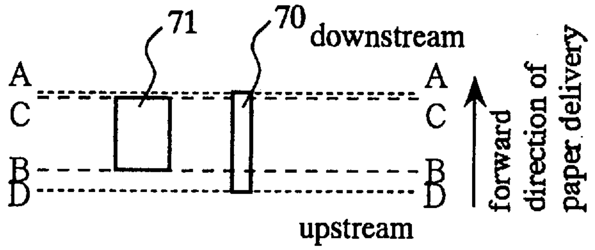
FIG. 27C PRIOR ART
Figure 27D:
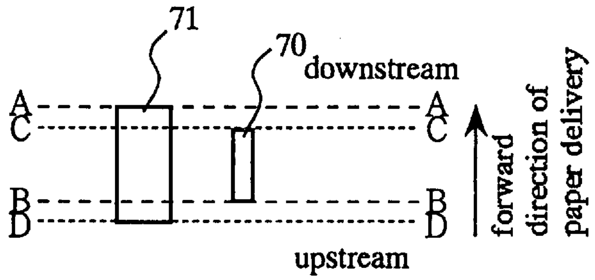
FIG. 27D PRIOR ART
Figure 27E:
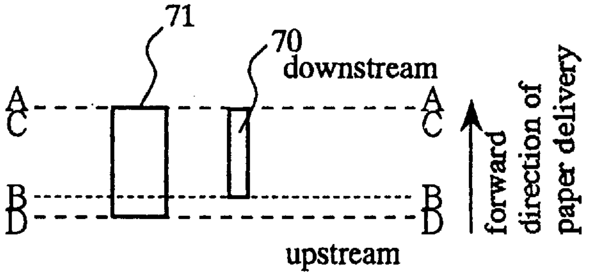
FIG. 27E PRIOR ART
Figure 27F:
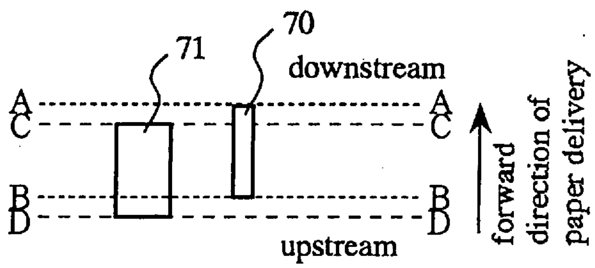
FIG. 27F PRIOR ART
Figure 27G:
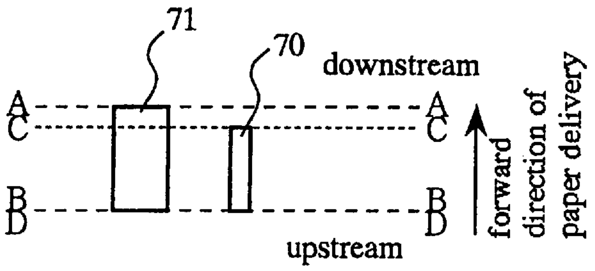
FIG. 27G PRIOR ART
Figure 27H:
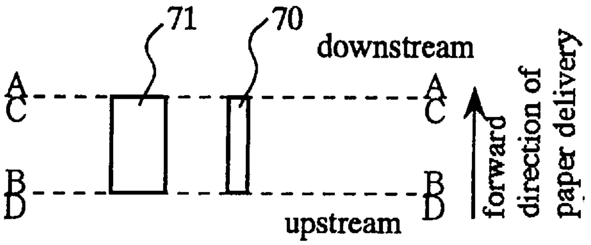
FIG. 27H PRIOR ART
Figure 27I:
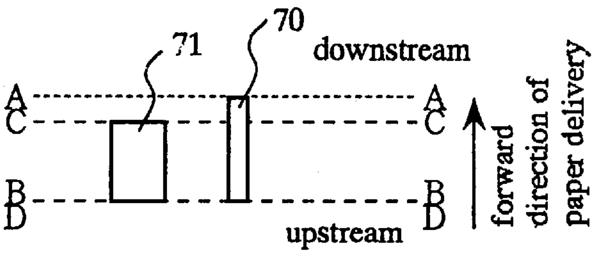
FIG. 27I PRIOR ART

FIGS. 23 and 24 illustrate a sixth example of a fixing lamp suitable for use in the present invention. FIGS. 23 and 24 are also the same as FIGS. 12 and 13 in the first example and FIGS. 21 and 22 in the fifth example, where FIG. 23 is a partially broken front view as viewed from the thermal recording paper, and FIG. 24 is a cross-sectional view taken along a line A—A' shown in FIG. 23.

The sixth example is common to the fifth example except that different glass packages are used for each color. For example, a glass package 110*a* for fixing a yellow color and a glass package 110*b* for fixing a magenta color, and gases with which the glass packages 110*a* and 110*b* are filled, are arranged for respectively radiating ultraviolet rays having wavelengths required for fixing (a peak wavelength of 420 nm and a peak wavelength of 365 nm) when discharges are induced between two sets of counter electrodes 119*a* and 119*b* and 120*a* and 120*b*. Therefore, different glass packages are used for each color in the present example, whereby emission of light having a predetermined wavelength is obtained by the gases, thereby eliminating the necessity of the fluorescent materials as in the above-described examples.

Although in the above-described examples, a case was described where the voltage applied the fixing lamps was an AC voltage, a DC voltage can also be used by a slight modification of the arrangement.

As is apparent from the foregoing description, the above-described fixing lamp has counter electrodes approximately parallel to the row of heating resistors, whereby the density of electrons discharged from the counter electrodes reaches uniformity in the longitudinal direction of the electrodes. As a result, the distribution of the intensity of radiated light rays or electromagnetic waves having a particular wavelength is also uniform in the same direction, thereby bringing about uniform fixing with respect to the thermal recording paper to which the row of heating resistors is applied. Consequently, the image quality can be increased, thereby making it possible to obtain a clear color image. There is little unnecessary light emission, thereby making it possible to achieve low power, high speed and miniaturization of the power supply.

As described above, the fixing lamp has a section emitting light in a surface area shape which faces the thermal recording paper, whereby more uniform intensity distribution is obtained, thereby to make it possible to thin and miniaturize the fixing lamp, which is advantages when the fixing lamp is changed into a serial scanning device carried on a carriage on which the row of heating resistors is carried, for example.

Additionally, as described above, the recording apparatus has restricting means abutting against the thermal recording paper for restricting light rays or electromagnetic waves having a particular wavelength radiated from the section emitting light in a surface area shape to a portion of the thermal recording paper which faces the section emitting light in a surface shape, thereby making it possible to accurately irradiate the light rays or the electromagnetic waves having a particular wavelength onto a portion to be fixed. Accordingly, there is little unnecessary light emission, thereby making it possible to achieve lower power, high speed and miniaturization of the power supply as well as to bring both the row of heating resistors and the fixing lamp into close proximity to each other. Particularly, the serial scanning device can perform color development and fixing almost simultaneously, thereby making it possible to reduce total printing time.

Furthermore, as described in the foregoing, the row of heating resistors and the fixing lamp are carried on a common carriage moving while abutting against the thermal recording paper. A flexible heat radiator is related to at least one of the row of heating resistors and the fixing lamp, thereby making it possible to prevent thermal effects between the row of heating resistors and the fixing lamp, which is effective when expanded into the serial scanning type apparatus.

Although a case was described where the fixing lamp is used for a serial scanning type thermal head, it is also applicable to a longitudinal fixing lamp in a recording using a line-shaped thermal head. Further, as a method of changing the area (the width) of a light emitting area, the width of the electrodes is changed. When a light emitting area in a wider range is required, however, a method of increasing the row of electrodes to a plurality of rows of electrodes may be employed.

Furthermore, the fixing lamp used in the third embodiment can be used as the fixing lamps in the UV-fixable thermal recording apparatuses according to the first and second embodiments.

Although the present invention has been described and illustrated in detail, it is clearly understood that the same is by way of illustration and example only, and is not to be taken by way of limitation. The spirit and scope of the present invention are to be limited only by the terms of the appended claims.

What is claimed is:

1. A UV-fixable thermal recording apparatus for recording on thermal recording paper, comprising:

a row of a plurality of heating resistors having a certain length for supplying a plurality of different amounts of heat energy to the thermal recording paper, which paper is moved from an upstream side to a downstream side in a same direction as the alignment of said row of heating resistors and on which respective colors are to be selectively fixed by electromagnetic waves of respectively different wavelengths and the developed color density of the paper depends on the amount of heat applied to form a color image on the thermal recording paper:

at least one fixing lamp for generating the electromagnetic waves to expose an area of the paper, said area having a width in the direction of paper movement, that is greater than the length of said row of heating resistors;

means for scanning said row of heating resistors and said at least one fixing lamp in a direction intersecting the direction of paper movement; and said at least one fixing lamp and said row of heating resistors being so arranged that the position on the upstream side of paper movement of the end of the width of the area exposed by said at least one fixing lamp is downstream of the position on the upstream side of paper movement of the end of the row of heating resistors.

2. A UV-fixable thermal recording apparatus according to claim 1 in which the electromagnetic waves are light waves.

3. A UV-fixable thermal recording apparatus according to claim 2 in which the light has a wavelength of between 420 mm and 365 nm, and the colors are yellow, magenta and cyan.

4. A UV-fixable thermal recording apparatus for thermal recording paper comprising:

a row of a plurality of heating resistors having a certain length for supplying a plurality of different amounts of heat energy to the thermal recording paper, which is moved from an upstream side to a downstream side in a same direction as the alignment of said row of heating resistors and on which respective colors are to be selectively fixed by electromagnetic waves of respectively different wavelengths, and the developed color density of the paper depends on the amount of heat applied to form a color image on the thermal recording paper;

at least one fixing lamp for generating the electromagnetic waves to expose an area of the paper, said area having a width in the direction of paper movement that is greater than the length of said row of heating resistors; and said at least one fixing lamp and said row of heating resistors being so arranged that the position on the upstream side of paper movement of the end of the width of the area exposed by said at least one fixing lamp is downstream of the position on the upstream side of paper movement resistors, and wherein said row of heating resistors and said at least one fixing lamp are carried on a common carriage.

5. The UV-fixable thermal recording apparatus according to claim 4, further including a flexible heat radiator mounted adjacent to said row of heating resistors and/or said at least one fixing lamp.

6. The UV-fixable thermal recording apparatus according to claim 4, wherein said at least one fixing lamp has counter electrodes substantially parallel to said row of heating resistors, said counter electrodes inducing discharges therebetween to irradiate electromagnetic waves having a particular wavelength.

7. The UV-fixable thermal recording apparatus according to claim 6, wherein said at least one fixing lamp further comprises a section emitting said electromagnetic waves to impinge on the surface of the thermal recording paper.

8. The UV-fixable thermal recording apparatus according to claim 9, wherein said at least one fixing lamp further includes restricting means for abutting against the thermal recording paper for blocking said electromagnetic waves, having a particular wavelength which are emitted from said section of said at least one fixing lamp, from reaching the thermal recording paper which faces said section.

9. A UV-fixable thermal recording apparatus for supplying a plurality of intensities of heat energy from heating resistors to thermal recording paper which is moved in a direction from an upstream side to a downstream side and on which respective colors can be selectively fixed by electromagnetic waves of respectively different wavelengths and the developed color density depends on the amount of heat applied to form a color image on the thermal recording paper, comprising:

n (where n is an integer of not less than two) rows of a plurality of heating resistors, each row corresponding to one of a plurality of n colors, each of said rows of heating resistors being arranged parallel to the direction of paper movement; and (n−1) fixing lamps for generating the electromagnetic waves, means for scanning said n rows of heating resistors and said n−1 fixing lamps in a direction intersecting the direction of paper movement;

an area of the paper exposed to waves from one of said fixing lamps for an arbitrary k-th (where k is an integer) color being positioned between the position of the row of heating resistors for the k-th color and the position of the row of heating resistors for the (k+1)-th color in the scanning direction of said rows of heating resistors intersecting said direction of paper movement, and the position of the end of the width of the area of the paper exposed by the respective fixing lamp for the arbitrary k-th color on the upstream side of paper delivery movement being downstream of the position of the end of the row of heating resistors for said k-th color on the upstream side and upstream of the position of the end of the row of heating resistors for the (k+1)-th color on the upstream side.

10. The UV-fixable thermal recording apparatus according to claim 9, wherein a fixing lamp has counter electrodes approximately parallel to a row of heating resistors, which electrodes induce discharges between the counter electrodes to irradiate electromagnetic waves having a particular wavelength.

11. The UV-fixable thermal recording apparatus according to claim 10, wherein said fixing lamp further comprises a section emitting said waves in a direction to impinge on the surface of the thermal recording paper.

12. The UV-fixable thermal recording apparatus according to claim 11, wherein said fixing lamp further comprises means for blocking said electromagnetic waves, having a particular wavelength, which are radiated from an area of said section emitting waves to a portion of the thermal recording paper which faces said area of said section emitting waves.

13. A UV-fixable thermal recording apparatus according to claim 9 in which the electromagnetic waves are light.

14. A UV-fixable thermal recording apparatus according to claim 13 in which the light has a wavelength of between 420 mm and 365 nm, and the colors are yellow, magenta and cyan.

15. A UV-fixable thermal recording apparatus for supplying a plurality of intensities of heat energy from heating resistors to thermal recording paper which is moved in a direction from an upstream side to a downstream side and on which respective colors can be selectively fixed by electromagnetic waves of respectively different wavelengths and the developed color density depends on the amount of heat applied to form a color image on the thermal recording paper, comprising:

n (where n is an integer of not less than two) rows of a plurality of heating resistors, each row corresponding to one of a plurality of n colors, each of said rows of heating resistors being arranged parallel to the direction of paper movement; and (n−1) fixing lamps for generating the electromagnetic waves, an area of the paper exposed to waves from one of said fixing lamps for an arbitrary k-th (where k is an integer) color being positioned between the position of the row of heating resistors for the k-th color and the position of the row of heating resistors for the (k+1)-th color in a scanning direction of said rows of heating resistors intersecting said direction of paper movement, and the position of the end of the width of the area of the paper exposed by the respective fixing lamp for the arbitrary k-th color on the upstream side of paper delivery movement being downstream of the position of the end of the row of heating resistors for said k-th color on the upstream side and upstream of the position of the end of the row of heating resistors for the (k+1)-th color on the upstream side, wherein said n rows of heating resistors and said n−1 fixing lamps are carried on a common carriage.

16. The UV-fixable thermal recording apparatus according to claim 15, further including a flexible heat radiator mounted adjacent to said row of heating resistors and/or said at least one fixing lamp.

17. A UV-fixable thermal recording method in which a plurality of intensities of heat energy are supplied by heating resistors to thermal recording paper moving in an upstream to downstream direction on which respective colors are to be selectively fixed by light rays or electromagnetic waves and the developed color density of the paper to form a color image thereon, wherein there is provided a recording head comprising at least one fixing lamp and a row of a plurality of heating resistors arranged parallel to the direction of paper movement, the width in the direction of paper movement of an area of the paper exposed to the rays or waves from one of said plurality of fixing lamps being larger than the length of said row of heating resistors, and said one fixing lamp and said row of heating resistors being arranged so that the position on the upstream side of paper movement of the end of the exposure area of said one fixing lamp is downstream of the position of the end of the row of heating resistors on the upstream side, comprising the steps of:

scanning said recording head in a direction intersecting the direction of paper movement to print an arbitrary k-th (where k is an integer) color in an arbitrary i-th (where i is an integer) line being printed;

conveying said thermal recording paper in the backward direction from that of normal paper from upstream to downstream by an amount which is predetermined with resect to the k-th color over all the lines at a distance longer than the distance between the position of an end of the width of the area of exposure of the fixing lamp for the k-th color on the downstream side and the position of the end on the downstream side of the row of heating resistors, and is shorter than the pitch corresponding to one line of printing;

performing said scanning and conveying steps for all colors in the i-th line; and moving the thermal recording paper in the normal upstream to downstream direction by the sum of the pitch corresponding to one line and the total amount of conveying of the thermal recording paper in the backward direction during printing of the colors in the i-th line before printing of colors in the (i+1)-th line.

* * * * *